(12) United States Patent
Ohtani et al.

(10) Patent No.: US 8,679,449 B2
(45) Date of Patent: Mar. 25, 2014

(54) METHOD AND APPARATUS FOR PRODUCING METAL OXIDE PARTICLES

(75) Inventors: Bunsho Ohtani, Sapporo (JP); Yasushi Kuroda, Toyama (JP); Noriyuki Sugishita, Toyama (JP)

(73) Assignees: National University Corporation Hokkaido University, Hokkaido (JP); Showa Denko K.K., Tokyo (JP)

(*) Notice: Subject to any disclaimer, the term of this patent is extended or adjusted under 35 U.S.C. 154(b) by 250 days.

(21) Appl. No.: 12/645,058

(22) Filed: Dec. 22, 2009

(65) Prior Publication Data

US 2010/0098620 A1    Apr. 22, 2010

Related U.S. Application Data

(63) Continuation of application No. PCT/JP2009/005363, filed on Oct. 14, 2009.

(30) Foreign Application Priority Data

Oct. 15, 2008  (JP) ................................ 2008-266675

(51) Int. Cl.
    *C01G 23/047*    (2006.01)
(52) U.S. Cl.
    USPC .......................................... 423/613; 423/612
(58) Field of Classification Search
    USPC .......... 423/612, 613; 422/156, 158, 198, 236
    See application file for complete search history.

(56) References Cited

U.S. PATENT DOCUMENTS

| | | | |
|---|---|---|---|
| 3,966,892 A * | 6/1976 | Okudaira et al. | 423/613 |
| 5,556,600 A * | 9/1996 | Gebben et al. | 422/108 |
| 7,413,726 B2 * | 8/2008 | Surender et al. | 423/614 |
| 2005/0271578 A1 | 12/2005 | Terada et al. | |
| 2007/0292340 A1 * | 12/2007 | Plischke et al. | 423/613 |
| 2008/0000520 A1 * | 1/2008 | Uchida et al. | 136/252 |
| 2008/0274040 A1 * | 11/2008 | Flynn et al. | 423/612 |

FOREIGN PATENT DOCUMENTS

| | | |
|---|---|---|
| EP | 1 586 681 A1 | 10/2005 |
| JP | 03-252315 A | 11/1991 |
| JP | 2001-287997 A | 10/2001 |
| JP | 2006-052099 A | 2/2006 |
| WO | 2004/063431 A1 | 7/2004 |

OTHER PUBLICATIONS

Kobata et al., "Growth and Transformation of TiO2 Crystallites in Aerosol Reactor" AiChE Journal, Mar. 1991, vol. 37, No. 3.*

(Continued)

*Primary Examiner* — Anthony J Zimmer
(74) *Attorney, Agent, or Firm* — Sughrue Mion, PLLC

(57) ABSTRACT

Provided is a method for producing decahedral titanium oxide particles, wherein the decahedral titanium oxide particles are produced by allowing a reaction gas containing titanium tetrachloride to flow into a reaction pipe having a partial double-pipe structure in which a hollow internal cylinder is inserted into an upstream portion of a hollow external cylinder, the method comprising: performing a preheating on the reaction gas containing titanium tetrachloride and a barrier gas not containing metal chlorides in a region on the upstream side of a downstream end of the hollow internal cylinder, while allowing the reaction gas to flow into the hollow internal cylinder and the barrier gas to flow between the hollow internal cylinder and the hollow external cylinder; and performing a main heating on the reaction gas in a downstream region apart from the downstream end of the hollow internal cylinder to thermally decompose the titanium tetrachloride.

16 Claims, 5 Drawing Sheets

(56) References Cited

OTHER PUBLICATIONS

Jang et al., "The Effects of Temperature on Particle Size in the Gas-Phase Production of TiO2", Aerosol Science and Technology, vol. 23, 1995, pp. 553-560, XP002619032.

Jang, H. D., "Effects of H2O on the Particle Size in the Vapor-Phase Synthesis of TiO2", Ceramics Processing, vol. 43, No. 11a, 1997, pp. 2704-2709, XP002619033.

Daisuke et al., 98th Catalyst Symposium, (Sep. H18), Symposium A, (2006), p. 234.

Yang et al., "Anatase TiO2 single crystals with a large percentage of reactive facets", Nature, vol. 453. May 29, 2008, pp. 638-641.

Notice of Allowance with a mailing date of Aug. 27, 2013 for corresponding JP Application No. 2008-266675.

Yoshihiro Terada; "Synthesis of decahedral-shaped titania crystallites by vapor phase reaction and their photocatalytic properties"; Proceedings of the Chemical Society of Japan; 2004; vol. 84, No. 4; p. 484.

* cited by examiner

METHOD AND APPARATUS FOR PRODUCING METAL OXIDE PARTICLES

This application is a continuation of a PCT Application No. PCT/JP2009/005363, filed on Oct. 14, 2009. Priority is claimed on Japanese Patent Application No. 2008-266675, filed Oct. 15, 2008, the content of which is incorporated herein by reference.

TECHNICAL FIELD

The present invention relates to a method and apparatus for producing decahedral titanium oxide particles.

BACKGROUND ART

In recent years, titanium oxide particles have gained attention as a photocatalyst, and a method for producing the same has been examined. For example, Patent Documents 1 and 2 and Non-Patent Document 1 disclose titanium oxide particles (hereinafter, referred to as "decahedral titanium oxide particles") formed in a decahedral box shape and mainly having an anatase-type crystal and a method for producing the same. It is described that the decahedral titanium oxide particles have a high activity as a photocatalyst since the decahedral titanium oxide particles have a large surface area per unit of the mass, a high crystallinity, and a small inner defect. In addition, in Non-Patent Document 2, it is described that the decahedral titanium oxide particles are largely expected as a photocatalyst since the ratio of a highly active (001) surface is high.

In the method of producing the decahedral titanium oxide particles disclosed in Non-Patent Document 2, since a hydrothermal reaction using hydrofluoric acid is used, the method is not suitable for industrial production. For this reason, we have additionally examined the method of producing the decahedral titanium oxide particles disclosed in Patent Documents 1 and 2 and Non-Patent Document 1.

In the method for producing the decahedral titanium oxide particles disclosed in Patent Documents 1 and 2 and Non-Patent Document 1, vapor of titanium tetrachloride and oxygen introduced into the reaction pipe are rapidly heated and cooled by heating the reaction pipe from the outside thereof, and the reaction expressed by the following chemical formula (1) is performed.

$$TiCl_4 + O_2 \rightarrow TiO_2 + 2Cl_2 \qquad (1)$$

According to the reaction shown in the chemical formula (1), a powder product containing decahedral titanium oxide particles was obtained in a region on the downstream side of the reaction region. However, the ratio of the powder product was less than 40% among the total product, and the rest was a white film-shaped product fixed to the inner wall surface of the reaction pipe in the reaction region.

As described above, in the method for producing the decahedral titanium oxide particles disclosed in Patent Documents 1 and 2 and Non-Patent Document 1, a large amount of the film-shaped product was fixed to the inner wall surface of the reaction pipe, which caused a problem that the productivity of the decahedral titanium oxide particles deteriorated.

In addition, when the reaction was continued in the state where the film-shaped product was fixed to the inner wall surface of the reaction pipe, a result was obtained such that the film-shaped product was more easily produced and the ratio of the decahedral titanium oxide particles among the powder product gradually decreased.

In addition, in the production method, the same result obtained in the case of producing the decahedral titanium oxide particles was obtained even in the case of synthesizing another titanium oxide particles. As a result, there was a problem that 50% or more of the product was the film-shaped product fixed to the inner wall surface of the reaction pipe.

For this reason, in order to efficiently and continuously produce the decahedral titanium oxide particles or the other titanium oxide particles, it is necessary to prevent the film-shaped product from being generated on the inner wall surface of the reaction pipe.

PRIOR ART

Patent Document
  Patent Document 1: PCT publication No. 04/063431
  Patent Document 2: Japanese Unexamined Patent Application, First Publication No. 2006-52099
Non-Patent Document
  Non-Patent Document 1: Kusano Daisuke, Terada Yoshihiro, Abe Ryuu, and Ootani Fumiaki, 98th Catalyst Symposium (Sep. H18), Symposium A, p. 234
  Non-Patent Document 2: Hua Gui Yang et al., Nature, Vol. 453, p. 638 to p. 641

DISCLOSURE OF THE INVENTION

Problems to be Solved by the Invention

The present invention was made in consideration of the above circumstances, and an object of the present invention is to provide a method and apparatus for producing decahedral titanium oxide particles capable of efficiently and continuously producing metal oxide particles by rapidly heating and cooling vapor of metal chlorides and oxygen while suppressing the generation of the film-shaped product fixed to the inner wall portion of the reaction pipe.

Means for Solving the Problems

The present inventors have carefully examined and studied the above-described problems in order to solve the problems, and found that decahedral titanium oxide particles can be efficiently produced by suppressing the film-shaped product from being generated on the inner wall surface of the reaction pipe in such a manner that a double pipe having a hollow external cylinder and an inserted hollow internal cylinder, which exists in the hollow external cylinder from an upstream portion of the hollow external cylinder to the middle portion thereof, is used, a gas not containing vapor of titanium tetrachloride is allowed to flow into the hollow external cylinder, a gas containing vapor of titanium tetrachloride is allowed to flow into the hollow internal cylinder, and the two kinds of gases are merged in a region on the downstream side of the hollow internal cylinder and are rapidly heated and cooled.

That is, the present invention adopts the following means.

(1) There is provided a method for producing decahedral titanium oxide particles, wherein the decahedral titanium oxide particles are produced by allowing a reaction gas containing titanium tetrachloride to flow into a reaction pipe having a partial double pipe structure in which a hollow internal cylinder is inserted into an upstream portion of a hollow external cylinder, and the method including:
performing a preheating on the reaction gas containing titanium tetrachloride and a barrier gas not containing metal chlorides in a region on the upstream side of a downstream end of the hollow internal cylinder, while allowing the reaction gas to flow into the hollow internal cylinder and the barrier gas to flow between the hollow internal cylinder and the hollow external cylinder; and performing a main heating on the reaction gas in a downstream region apart from the downstream end of the hollow internal cylinder to thermally decompose the titanium tetrachloride.

(2) In the method according to (1), the preheating temperature is equal to or more than 136° C. and equal to or less than 750° C.

(3) In the method according to any one of (1) and (2), the main heating temperature is equal to or more than 800° C. and equal to or less than 1500° C.

(4) In the method according to any one of (1) to (3), the reaction gas contains oxygen gas and/or nitrogen gas.

(5) In the method according to any one of (1) to (4), the barrier gas contains oxygen gas, nitrogen gas, argon, water vapor, or at least two kinds of gases among them.

(6) In the method according to any one of (1) to (5), a sectional area of a passageway for the barrier gas between the hollow external cylinder and the hollow internal cylinder is equal to or more than two times a sectional area of a passageway for the reaction gas of the hollow internal cylinder.

(7) In the method according to any one of (1) to (6), a sectional area of a passageway of the reaction pipe on the downstream side of the downstream end of the hollow internal cylinder is equal to or more than three times a sectional area of a passageway for the reaction gas of the hollow internal cylinder.

(8) In the method according to any one of (1) to (7), the ratio between a linear velocity of the barrier gas and a linear velocity of the reaction gas, which are located on the upstream side of the downstream end of the hollow internal cylinder, is equal to or more than 0.1 and equal to or less than 10.

(9) Iii the method according to any one of (1) to (8), the concentration of the titanium tetrachloride contained in the reaction gas, which is located on the upstream side of the downstream end of the hollow internal cylinder, is equal to or more than 0.5 and equal to or less than 50 vol %.

(10) In the method according to any one of (1) to (9), the concentration of the titanium tetrachloride contained in a merged gas having the reaction gas and the barrier gas, which is located on the downstream side of the downstream end of the hollow internal cylinder, is equal to or more than 0.1 and equal to or less than 20 vol %.

(11) In the method according to any one of (1) to (10), the time until the reaction gas discharged from the downstream end of the hollow internal cylinder arrives at the most upstream end of a main heating region heated to be equal to or more than 800° C. is equal to or less than 250 milliseconds.

(12) In the method according to (11), the time during which the reaction gas stays at the main heating region is equal to or more than 2 and equal to or less than 500 milliseconds.

(13) In the method according to any one of (1) to (12), the Reynolds number of the reaction gas is equal to or more than 10 and equal to or less than 10,000.

(14) There is provided an apparatus for producing decahedral titanium oxide particles by allowing a reaction gas containing titanium tetrachloride to flow into a reaction pipe having a partial double pipe structure in which a hollow internal cylinder is inserted into an upstream portion of a hollow external cylinder, the apparatus including: a preheating region which is provided on the upstream side of a downstream end of the hollow internal cylinder to perform a preheating on the reaction gas containing titanium tetrachloride flowing in the hollow internal cylinder and a barrier gas not containing metal chlorides flowing between the hollow internal cylinder and the hollow external cylinder; and a main heating region which is provided in a downstream region apart from the downstream end of the hollow internal cylinder to perform a main heating on the reaction gas and to thermally decompose the metal chloride.

Effects of the Invention

With the above-described configuration, it is possible to provide a method and apparatus for producing decahedral titanium oxide particles, wherein the method and apparatus are capable of efficiently and continuously producing metal oxide particles by rapidly heating and cooling vapor of metal chlorides and oxygen while suppressing the generation of the film-shaped product fixed to the inner wall portion of the reaction pipe.

The method for producing the decahedral titanium oxide particles according to the present invention is a method for producing the decahedral titanium oxide particles by allowing the reaction gas to flow into the reaction pipe having a partial double-pipe structure in which the hollow internal cylinder is inserted into the upstream portion of the hollow external cylinder. The method includes the steps of allowing the reaction gas containing titanium tetrachloride as metal chlorides to flow in the hollow internal cylinder and a barrier gas not containing metal chlorides to flow between the hollow internal cylinder and the hollow external cylinder while performing a preheating on the reaction gas and the barrier gas on the upstream side of the downstream end of the hollow internal cylinder. Then, a main heating is performed on the reaction gas in a downstream region apart from the downstream end of the hollow internal cylinder so as to thermally decompose the metal chlorides. Accordingly, it is possible to efficiently produce decahedral titanium oxide particles suitable as a photocatalyst in such a manner that a temperature suitable for the main heating is obtained in a short time the oxidization reaction between vapor of metal chlorides and oxygen is promptly performed, and the generation of the film-shaped product generated on the inner wail surface of the reaction pipe is suppressed.

The apparatus for producing decahedral titanium oxide particles according to the present invention is an apparatus for producing decahedral titanium oxide particles by allowing the reaction gas to flow in the reaction pipe having a partial double-pipe structure in which the hollow internal cylinder is inserted in the upstream portion of the hollow external cylinder. The preheating region is provided on the upstream side of the downstream end of the hollow internal cylinder so as to perform a preheating on the reaction gas containing titanium tetrachloride as metal chlorides flowing in the hollow internal cylinder and the barrier gas not containing metal chlorides flowing between the hollow internal cylinder and the hollow external cylinder. The main heating region is provided in a downstream region apart from the downstream end of the hollow internal cylinder so as to perform a main heating on the reaction gas and to thermally decompose the metal chlorides. With the above-described configuration, it is possible to efficiently produce the titanium oxide particles by suppressing the generation of the film-shaped product generated on the inner wall surface of the reaction pipe.

BEST MODE FOR CARRYING OUT THE INVENTION

The present invention relates to a method and apparatus for producing decahedral titanium oxide particles, and particularly, to a method and apparatus capable of efficiently producing decahedral titanium oxide particles by rapidly heating oxygen and vapor of titanium tetrachloride in the form of a gas.

Hereinafter, embodiments of the present invention will be described. However, the present invention is not limited to the embodiments to be described later, but the constituents of the embodiments may be appropriately combined with each other.

(First Embodiment)
<Apparatus for Producing Metal Oxide Particles>

Figure 1:
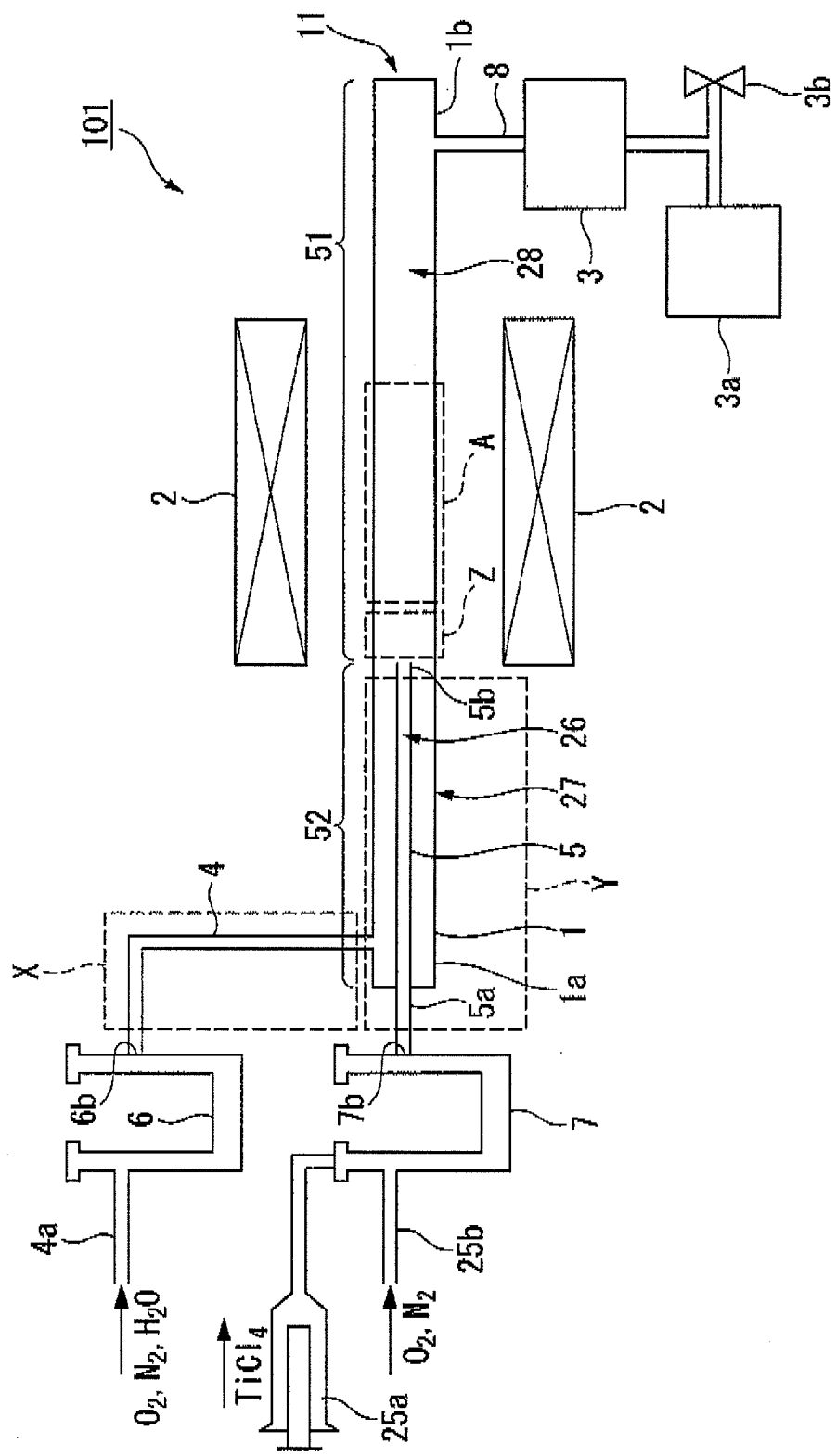
FIG. 1 is a schematic view showing an example of an apparatus for producing metal oxide particles (decahedral titanium oxide particles) according to an embodiment of the present invention.

FIG. 1 is a schematic view showing an example of an apparatus for producing metal oxide particles (decahedral titanium oxide particles) according to an embodiment of the present invention. Hereinafter, an example of the case of producing titanium oxide particles will be described.

As shown in FIG. 1, an apparatus 101 for producing metal oxide particles according to the embodiment of the present invention schematically includes: a reaction pipe 11 which includes a double-pipe structure portion 52 having a hollow external cylinder 1 and a hollow internal cylinder 5 inserted in the hollow external cylinder at the position ranging from an upstream portion 1a of the hollow external cylinder 1 to the middle portion thereof and a single-pipe structure portion 51 having only the hollow external cylinder 1; a heating device 2 which is disposed on the outside of the reaction pipe 11 so as to locally heat the single-pipe structure portion 51; barrier gas introduction pipes 4 and 4a which are connected to the upstream portion 1a of the hollow external cylinder 1; reaction gas introduction pipes 25a and 25b which are connected to an upstream portion 5a of the hollow internal cylinder 5; and a product collecting portion 3 which is connected to a downstream portion 1b of the hollow external cylinder 1. As the reaction pipe 11, for example, a cylindrical pipe formed of quartz or the like may be exemplified.

That is, in the reaction pipe 11, a portion on the upstream side of a downstream end 5b of the hollow internal cylinder 5 is formed as the double-pipe structure portion 52 (partial double-pipe structure), and a portion on the downstream side of the downstream end 5b of the hollow internal cylinder 5 is formed as the single-pipe structure portion 51.

The upstream portion 1a of the hollow external cylinder 1 is connected to the barrier gas introduction pipe 4 for introducing a barrier gas not containing metal chlorides such as titanium tetrachloride, and the barrier gas introduction pipe 4 is connected to the barrier gas introduction pipe 4a through a vaporizer 6.

Although it is not shown in the drawing, the barrier gas introduction pipe 4a is connected to a supply source of oxygen ($O_2$), nitrogen ($N_2$), and water through a valve. The temperature of the vaporizer 6 is set to, for example, 165° C., and the water introduced from the barrier gas introduction pipe 4a is evaporated so as to be changed into vapor of water. Accordingly, a barrier gas which is a mixture gas of oxygen, nitrogen, and steam can be supplied from the barrier gas introduction pipe 4 to the hollow external cylinder 1.

The upstream portion 5a, of the hollow internal cylinder 5 is connected to the reaction gas introduction pipes 25a and 25b for introducing a reaction gas containing vapor of metal chlorides such as titanium tetrachloride ($TiCl_4$) through a vaporizer 7.

Although it is not shown in the drawing, the reaction gas introduction pipe 25a is connected to a supply source of titanium tetrachloride through a valve, and is capable of supplying titanium tetrachloride to the hollow internal cylinder 5.

In addition, the reaction gas introduction pipe 25b is connected to supply sources of oxygen and nitrogen through a valve, and is capable of supplying oxygen and nitrogen to the hollow internal cylinder 5.

The temperature of the vaporizer 7 is set to, for example, 165° C., and titanium tetrachloride is evaporated so as to be changed into titanium tetrachloride vapor. Accordingly, a reaction gas which is a mixture gas of oxygen, nitrogen and titanium tetrachloride can be supplied to the hollow external cylinder 1.

The hollow internal cylinder 5 is formed while being inserted in the hollow external cylinder 1 from the upstream portion 1a of the hollow external cylinder 1 to the middle portion thereof, and the downstream end 5b thereof is disposed in the vicinity of the center in the longitudinal direction of the hollow external cylinder 1. Accordingly, the reaction pipe 11 includes the double-pipe structure portion 52, which has the hollow external cylinder 1 and the hollow internal cylinder 5, and the single-pipe structure portion 51 having only the hollow external cylinder 1.

The double-pipe structure portion 52 is provided with two openings, that is, a hollow internal cylinder opening 26 which is set to have the inner diameter of the hollow internal cylinder 5 and an annular opening 27 which is formed between the hollow external cylinder 1 and the hollow internal cylinder 5. In addition, the single-pipe structure portion 51 is provided with a hollow external cylinder opening 28 which is set to have the inner diameter of the hollow external cylinder 1.

In the double-pipe structure portion 52, it is desirable that the hollow external cylinder 1 is coaxially formed with the hollow internal cylinder 5.

When the reaction gas is collected toward the axis, it is possible to suppress the reaction gas from diffusing toward the inner wall surface of the reaction pipe 11 and to suppress the generation of the film-shaped product.

As the hollow internal cylinder 5, a hollow internal cylinder for generating a coaxial parallel flow, an oblique flow, a cross flow and the like may be used, but it is desirable to use the hollow internal cylinder for generating the coaxial parallel flow.

In general, the mixing performance of the hollow internal cylinder 5, which generates the coaxial parallel flow, is lower than that of the hollow internal cylinder for generating the oblique flow or the cross flow. In the present invention, when the reaction gas containing titanium tetrachloride flowing in the hollow internal cylinder 5 and the barrier gas not containing titanium tetrachloride flowing along the outside of the hollow internal cylinder 5 are merged at a position on the downstream side of the downstream end 5b of the hollow internal cylinder 5, it is desirable that the reaction gas and the barrier gas are hardly mixed with each other. When the reaction gas and the barrier gas are hardly mixed with each other, it is possible to suppress the reaction gas from diffusing toward the inner wall surface of the reaction pipe 11 and to suppress the generation of the film-shaped product.

Accordingly, it is desirable that the double-pipe structure portion 52 includes the hollow external cylinder 1 and the hollow internal cylinder 5 which can generate the coaxial parallel flow together with the hollow external cylinder 1.

As shown, in FIG. 1, a region from an exit 6b of the vaporizer 6 to the hollow external cylinder 1 is set to a preheating region X. In addition, a region from an exit 7b of the vaporizer 7 to the downstream end 5b of the hollow internal cylinder 5 is set to a preheating region Y.

In the preheating regions X and Y, the barrier gas introduction pipe 4 and the double-pipe structure portion 52 of the reaction pipe 11 are heated by an electric heater or the like disposed on the outside thereof, and the gas flowing inside the barrier gas introduction pipe 4 and the gas flowing inside the double-pipe structure portion 52 of the reaction pipe 11 are preheated. That is, the reaction gas containing titanium tetrachloride flowing in the hollow internal cylinder 5 and the barrier gas not containing titanium tetrachloride, which flows inside the barrier gas introduction pipe 4 and then flows inside the hollow external cylinder 1 of the double-pipe structure portion 52 but outside the hollow internal cylinder 5, are heated.

A portion on the downstream side of the position of the downstream end 5b of the hollow internal cylinder 5 is formed as the single-pipe structure portion 51 which consists of the hollow external cylinder 1. Two heating devices 2 are disposed on the outside of the reaction pipe 11 so as to locally heat the single-pipe structure portion 51.

As the heating device 2, for example, an infrared gold image furnace (manufactured by ULVAC-RIKO, Inc.) for performing a heating operation through the irradiation of infrared rays may be exemplified. However, the heating device is not limited to the example of the embodiment, and for example, an oxy-hydrogen burner or an electric heater may be used.

In addition, although the downstream end 5b of the hollow internal cylinder 5 is disposed at a position where the infrared rays emitted from the upstream part of the heating device (infrared gold image furnace) 2 are not irradiated, the end may be disposed at a position where the infrared rays are irradiated.

A portion on the downstream side of the downstream end 5b of the hollow internal cylinder 5 is provided with a main heating region A where a platinum plate (not shown) is wound around the reaction pipe 11 so as to surround the reaction pipe. Since the platinum plate is heated by absorbing the infrared rays irradiated from the heating device (infrared gold image furnace) 2, only a portion of the reaction pipe 1 contacting with the platinum plate is locally heated. Accordingly, metal chlorides such as titanium tetrachloride flowing inside the reaction pipe 11 are oxidized in the form of a gas, and metal oxide particles such as titanium oxide particles are generated.

The temperature of the main heating region A can be precisely controlled by the combination of the platinum plate and the heating device (infrared gold image furnace) 2. The intensity of the infrared rays irradiated from the heating device (infrared gold image furnace) 2 can be controlled by a temperature controller (not shown), and can be set to an arbitrary temperature equal to or more than 800° C. and equal to or less than 1,500° C.

As shown in FIG. 1, a middle region Z not directly heated from the outside is provided between the preheating region Y and the main heating region A. In the middle region Z, the reaction gas flowing out of the hollow internal cylinder 5 and the barrier gas flowing out of the annular opening 27 between the hollow external cylinder 1 and the hollow internal cylinder 5 are merged to thereby form a merged gas.

The downstream portion 1b of the hollow external cylinder 1 is connected to the product collecting portion 3 collecting the product such as metal oxide particles through the discharge pipe 8. The product collecting portion 3 is formed by a bag filter or the like.

In addition, the downstream portion of the product collecting portion 3 is connected to a discharge pump 3a and a pressure control valve 3b. In general, when the product is collected in the product collecting portion 3 and the filter is blocked, the pressure inside the reaction pipe 11 increases. An increase in pressure is suppressed by the suction operation of the discharge pump 3a, and the oxidization reaction of metal chlorides occurs in the vicinity of normal pressure.

In addition, at this time, when the suction force of the discharge pump 3a is controlled by controlling the pressure control valve 3b, it is possible to more efficiently produce metal oxide particles.

The metal oxide particles collected by the product collecting portion 3 are, for example, decahedral titanium oxide particles or other titanium oxide particles.

The decahedral titanium oxide particles according to the embodiment indicate the titanium oxide particles having a decahedral box shape as in the definition of Patent Document 1.

Further, the other titanium oxide particles other than decahedral titanium oxide particles according to the embodiment indicate the titanium oxide particles which are not defined as the decahedral titanium oxide particles among the titanium oxide particles obtained by the production method according to the embodiment.

<Reaction Pipe Having Multi-Pipe Structure>

In FIG. 1, the production apparatus including the reaction pipe 11 having the double-pipe structure is described, but the apparatus for producing metal oxide according to the embodiment of the present invention is not limited thereto. For example, a production apparatus having a triple-pipe structure may be used, or a production apparatus having a multiple-pipe structure may be used.

For example, the case of using the apparatus for producing metal oxide comprising a reaction pipe having a triple-pipe structure will be described, where the triple-pipe structure has a hollow external cylinder, a hollow internal cylinder (middle hollow internal cylinder) disposed therein, and a hollow internal cylinder (innermost hollow internal cylinder) disposed therein, that is, the innermost side of the reaction pipe so as to generate a coaxial parallel flow. In the state where the downstream end of the innermost hollow internal cylinder and the downstream end of the middle hollow internal cylinder are disposed at the same position in the longitudinal direction, a barrier gas not containing metal chlorides such as titanium tetrachloride is allowed to flow into the innermost hollow internal cylinder, a reaction gas containing metal chlorides such as titanium tetrachloride is allowed to flow into an annular opening between the innermost hollow internal cylinder and the middle hollow internal cylinder, and a barrier gas not containing metal chlorides such as titanium tetrachloride is allowed to flow into an annular opening between the middle hollow internal cylinder and the hollow external cylinder. Accordingly, in a region on the downstream side of the downstream end of each hollow internal cylinder, it is possible to allow the barrier gas to surround the reaction gas, and to obtain titanium oxide particles while suppressing generation of a film-shaped product generated on the inner wall surface of the reaction pipe.

When the reaction pipe having the triple-pipe structure is used, the reaction gas containing metal chlorides such as titanium tetrachloride can be allowed to flow into the annular opening between the innermost hollow internal cylinder and the middle hollow internal cylinder, which is advantageous in that the passageway sectional area of the reaction gas can be more than that of the case of using the reaction pipe having the double-pipe structure. Accordingly, it is possible to further increase the reaction amount of titanium tetrachloride per hour, and to improve the productivity of metal oxide particles. In addition, the hollow external cylinder and two hollow internal cylinders may be coaxially or eccentrically arranged, but the coaxial arrangement is desirable.

<Method for Producing Metal Oxide Particles>

Next, a method for producing metal oxide particles (decahedral titanium oxide particles) according to the embodiment of the present invention will be described with reference to an example in which titanium oxide particles are produced by using the apparatus 101 for producing metal oxide particles shown in FIG. 1.

The method for producing the metal oxide particles according to the embodiment of the present invention uses the apparatus 101 for producing metal oxide particles and includes the steps of allowing a reaction, gas containing vapor of metal chlorides to flow into the hollow internal cylinder 5 and allowing a barrier gas not containing vapor of metal chlorides to flow into the hollow external cylinder 1, and then preheating the reaction gas and the barrier gas in the double-pipe structure portion 52 (preheating step); and allowing the reaction gas and the barrier gas to be merged in the single-pipe structure portion 51 and heating the merged gas containing the reaction gas and the barrier gas so as to produce the metal oxide particles (main heating step).

<Preheating Step>

First, oxygen, nitrogen, and water are introduced from the barrier gas introduction pipe 4a. After water is changed into vapor through the vaporizer 6, the mixture gas (hereinafter, a barrier gas) of oxygen, nitrogen and vapor is introduced into the barrier gas introduction pipe 4.

The barrier gas is a gas not containing metal chlorides such as titanium tetrachloride. Specifically, an example of the barrier gas includes oxygen ($O_2$), nitrogen, argon, vapor, ozone ($O_3$), and the like, which may be independently used or may be used in a mixed state. Accordingly, oxygen, nitrogen, argon, a mixture gas of oxygen and an inert gas, a mixture gas of oxygen and vapor, a mixture gas of oxygen, vapor and an inert gas, a mixture gas of vapor and an inert gas or the like may be used. In addition, air may be used as the mixture gas of oxygen and an inert gas.

Since a preheating region X is provided between the barrier gas introduction pipe 4 and the double-pipe structure portion 52, the barrier gas is heated to a predetermined preheating temperature during the time when the barrier gas flows into the barrier gas introduction pipe 4 and passes through the annular opening 27 between the hollow external cylinder 1 and the hollow internal cylinder 5 of the double-pipe structure portion 52.

Meanwhile, titanium tetrachloride is introduced from the reaction gas introduction pipe 25a. After the titanium tetrachloride is changed into vapor through the vaporizer 7, the vapor is mixed with oxygen and nitrogen introduced from the reaction gas introduction pipe 25b, and a mixture gas (hereinafter, a reaction gas) of vapor of titanium tetrachloride, oxygen and nitrogen flows into the hollow internal cylinder 5.

The reaction gas is a gas containing vapor of titanium tetrachloride. Specifically, examples of the reaction gas include a mixture gas of vapor of titanium tetrachloride and oxygen, a mixture gas of vapor of titanium tetrachloride and an inert gas, and a mixture gas of vapor of titanium tetrachloride, oxygen, and an inert gas. In addition, air may be used as the mixture gas of oxygen and an inert gas.

Since a preheating region Y is provided between the upstream portion of the hollow internal cylinder 5 and the double-pipe structure portion 52, the reaction gas flowing into the hollow internal cylinder 5 is heated to a predetermined preheating temperature. The preheating temperature of the preheating region Y is, for example, 150° C.

<Combination of Reaction Gas and Barrier Gas>

As the combination of the reaction gas and the barrier gas, it is the most desirable that a mixture gas of oxygen and vapor of titanium tetrachloride is used as the reaction gas and oxygen is used as the barrier gas. By means of the combination, it is possible to increase "the ratio of decahedral titanium oxide particles contained in the powder product", and to suppress the generation of the film-shaped product generated on the inner wall surface of the reaction pipe 11.

In addition, "the ratio of decahedral titanium oxide particles contained in the powder product" indicates the ratio of decahedral titanium oxide particles with respect to titanium oxide particles, which is obtained by observing an arbitrarily sampled powder product containing titanium oxide in an arbitrary field of view (FOV) using a scanning electron microscope.

Further, in the case where a mixture gas of vapor of titanium tetrachloride and oxygen is used as the reaction gas, and nitrogen gas is used as the barrier gas, it is possible to increase "the ratio of decahedral titanium oxide particles contained in the powder product". However, since it is not possible to completely suppress the generation of the film-shaped product generated on the inner wall surface of the reaction pipe 11, a small amount of the film-shaped product is generated on the inner wall surface of the reaction pipe 11.

Further, in the case where a mixture gas of vapor of titanium tetrachloride and oxygen is used as the reaction gas, and a mixture gas of oxygen and vapor is used as the barrier gas, the state of the product is changed in accordance with the value of the ratio "material amount of water [mol]/material amount of titanium tetrachloride [mol]".

First, in the case where the ratio of "material amount of water [mol]/material amount of titanium tetrachloride [mol]" is not less than 3, the film-shaped product is not fixed on the inner wall surface of the reaction pipe 11, but a cylindrical solid product grows at the downstream end 5b of the hollow internal cylinder 5. This phenomenon becomes apparent as the ratio of "material amount of water [mol]/material amount of titanium tetrachloride [mol]" increases. In addition, the adhesiveness between particles of the powder product becomes very large.

Further, in the case where the ratio of "material amount of water [mol]/material amount of titanium tetrachloride [mol]" is set to be equal to or more than 0.5 and equal to or less than 3, the cylindrical solid product hardly grows at the downstream end 5b of the hollow internal cylinder 5, and the length of the cylindrical solid product is shortened. In addition, the amount of the film-shaped product decreases as the supply amount of the vapor increases in the range, and the adhesion between particles in the powder product becomes large.

In addition, in the case where a mixture gas of vapor of titanium tetrachloride and nitrogen is used as the reaction gas and oxygen gas is used as the barrier gas, it is possible to increase "the ratio of decahedral titanium oxide particles contained in the powder product". However, since it is not possible to completely suppress the generation of the filth-shaped product generated on the inner wall surface of the reaction pipe 11, a small amount of the film-shaped product is generated on the inner wall surface of the reaction pipe 11.
<Preheating Temperature>

In the case where the reaction gas containing vapor of titanium tetrachloride and oxygen is used as in the embodiment, when the preheating temperatures of the preheating regions X and Y are excessively increased so that the temperature of the reaction gas is not less than 800° C., the oxidization reaction occurs between vapor of titanium tetrachloride and oxygen flowing inside the hollow internal cylinder 5, the titanium oxide particles are formed inside the hollow internal cylinder 5, and the film-shaped product is formed on the inner wall surface of the hollow internal cylinder 5. In this state, when the titanium oxide particles are continuously produced, the inside of the hollow internal cylinder 5 may be blocked by the film-shaped product. For this reason, it is desirable that the preheating temperature is less than at least 800° C.

In addition, in the case where the reaction gas containing vapor of titanium tetrachloride flowing inside the hollow internal cylinder 5 does not contain oxygen, the barrier gas needs to contain oxygen. Even in this case, when the preheating temperatures of the preheating regions X and Y are excessively increased so that the preheating temperatures of the reaction gas and the barrier gas exceed 750° C., a needle-shaped product is formed on the inner wall surface of the hollow internal cylinder 5, and the downstream end 5b of the hollow internal cylinder 5 may be blocked.

For this reason, it is more desirable that the preheating temperatures of the reaction gas and the barrier gas in the preheating regions X and Y are equal to or less than 750° C.

On the contrary, when the preheating temperatures of the preheating regions X and Y are set to be less than 136° C., which is the boiling temperature of titanium tetrachloride, a part of the vapor of titanium tetrachloride is condensed inside the hollow internal cylinder 5.

As described above, it is desirable that the preheating temperatures of the preheating regions X and Y are equal to or more than 136° C. and equal to or less than 750° C. In addition, it is more desirable that the preheating temperatures of the preheating regions X and Y are equal to or more than 150° C. and equal to or less than 500° C., and it is much more desirable that the preheating temperatures are equal to or more than 150° C. and equal to or less than 250° C.

When the preheating temperatures of the preheating regions X and Y are set to the above-described temperature ranges, the amount of heat causing the oxidization reaction between titanium tetrachloride and oxygen is not supplied to the preheating regions X and Y, and the oxidization reaction does not occur therein. However, when the gases are preheated to the preheating temperatures at the preheating regions X and Y, it is possible to rapidly heat the gases to the main heating temperature in the main heating region A. Accordingly, it is possible to cause the oxidization reaction at once, and to improve the efficiency in production of the titanium oxide particles.
<Main Heating Step>

The reaction gas and the barrier gas heated in the preheating regions X and Y are merged in the middle region Z to thereby form a merged gas. Subsequently, the merged gas is rapidly heated to a main heating temperature in the main heating region A, and is rapidly cooled in a region on the downstream side of the main heating region A to thereby form metal oxide particles.

In the case where the main heating region is provided without providing the middle region Z on the downstream side of the downstream end 5b of the hollow internal cylinder 5, the reaction gas is discharged from the downstream end 5b of the hollow internal cylinder 5 into the reaction pipe 11, and immediately a decomposition reaction of metal chlorides occurs to thereby form the film-shaped product at the downstream end 5b of the hollow internal cylinder 5. Accordingly, the hollow internal cylinder 5 may be blocked. However, since the middle region Z is provided, the merged gas containing the reaction gas is not heated in the middle region Z, and the temperature of the merged gas is less than 800° C. Accordingly, the above-described problem does not arise.
<Main Heating Temperature>

It is desirable that the heating temperature of the main heating region A is equal to or more than 800° C. and equal to or less than 1500° C.

In the case where the heating temperature of the main heating region A is less than 800° C., the oxidization reaction between vapor of titanium tetrachloride and oxygen shown in chemical formula (1) does not occur, and thus titanium oxide particles are not formed.

On the contrary, in the case where the heating temperature of the main heating region A exceeds 1,500° C., titanium oxide particles adhere to each other, and thus the specific surface area of titanium oxide particles decreases. Accordingly, the photocatalytic characteristic of the titanium oxide particles deteriorates.

It is more desirable that the heating temperature of the main heating region A is equal to or more than 1,000° C. and equal to or less than 1,300° C., and it is much more desirable that the heating temperature thereof is equal to or more than 1,100° C. and equal to or less than 1,300° C.

In the case where the heating temperature of the main heating region A is less than 1,100° C., vapor of titanium tetrachloride supplied to the reaction pipe 11 is not completely consumed, and a part of unreacted vapor of titanium tetrachloride may remain.

On the contrary, in the case where the heating temperature of the main heating region A exceeds 1,300° C., the adhesiveness between titanium oxide particles becomes apparent, and thus the specific surface area of titanium oxide particles decreases, and the photocatalytic characteristic of the titanium oxide particles deteriorates.

In the main heating region A, since the temperature of the inner wall surface of the reaction pipe 11 heated by the external heating device 2 is the highest, the oxidization reaction easily occurs in that portion, and hence the film-shaped product is fixed to the inner wall surface of the reaction pipe 11. The film-shaped product is more easily formed as the density of vapor of titanium tetrachloride becomes higher.

When a gas flows from the double-pipe structure portion 52 to the single-pipe structure portion 51, the reaction as flows out of the hollow internal cylinder 5, and the barrier gas flows out of the annular opening 27 between the hollow external cylinder 1 and the hollow internal cylinder 5. Since the barrier gas surrounds the reaction gas so that the reaction gas does not move closer to the inner wall surface of the reaction pipe 11, even when the temperature of the inner wall surface of the reaction pipe 11 in the main heating region A is the highest, it is possible to suppress the film-shaped product from being formed on the inner wall surface of the reaction pipe 11.
<Density of titanium tetrachloride>

In the double-pipe structure portion 52, it is desirable that the density of titanium tetrachloride flowing inside the hollow internal cylinder 5 is equal to or more than 0.5 and equal to or less than 50 vol %. It is more desirable that the density thereof is equal to or more than 1 and equal to or less than 30 vol %. It is much more desirable that the density thereof is equal to or more than 2 and equal to or less than 15 vol %. When the density of titanium tetrachloride flowing inside the hollow internal cylinder 5 is set to the above-described range, it is possible to suppress vapor of titanium tetrachloride from diffusing from the vicinity of the axis of the reaction pipe 11 toward the inner wall surface of the reaction pipe 11, and to prevent the reaction gas from moving closer to the inner wall surface of the reaction pipe 11. Accordingly, it is possible to further suppress the generation of the film-shaped product generated on the inner wall surface of the reaction pipe 11.

In the case where the density of titanium tetrachloride flowing inside the hollow internal cylinder 5 is higher than 50 vol %, the amount of the film-shaped product fixed to the inner wall surface of the reaction pipe 11 increases.

On the contrary, in the case where the density of titanium tetrachloride flowing inside the hollow internal cylinder 5 is lower than 0.5 vol %, the ratio of decahedral titanium oxide particles contained in the powder product decreases.

In the single-pipe structure portion 51, it is desirable that the density of titanium tetrachloride contained in the merged gas flowing inside the hollow external cylinder 1 is equal to or more than 0.1 and equal to or less than 20 vol %. It is more desirable that the density thereof is equal to or more than 0.1 and equal to or less than 5 vol %, It is more desirable that the density thereof is equal to or more than 0.2 and equal to or less than 2 vol %. When the density of titanium tetrachloride contained in the merged gas flowing inside the hollow external cylinder 1 is set to the above-described range, it is possible to suppress vapor of titanium tetrachloride from diffusing from the vicinity of the axis of the reaction pipe 11 toward the inner wall surface of the reaction pipe 11, and to prevent the reaction gas from moving closer to the inner wall surface of the reaction pipe 11. Accordingly, it is possible to further suppress the generation of the film-shaped product generated on the inner wall surface of the reaction pipe 11.

In the case where the density of titanium tetrachloride contained in the merged gas flowing inside the hollow external cylinder 1 is higher than 20 vol %, the amount of the film-shaped product fixed to the inner wall surface of the reaction pipe 11 increases.

On the contrary, in the case where the density of titanium tetrachloride contained in the merged gas flowing inside the hollow external cylinder 1 is lower than 0.1 vol %, the ratio of decahedral titanium oxide particles contained in the powder product decreases.

When the reaction gas and the barrier gas are discharged to the single-pipe structure portion 51, the reaction gas containing vapor of titanium tetrachloride is discharged from the hollow internal cylinder 5 disposed in the vicinity of the axis of the reaction pipe 11, and thus the density of titanium tetrachloride in the vicinity of the axis of the reaction pipe 11 is the highest.

When the merged gas passes through the main heating region A, the vapor of titanium tetrachloride gradually diffuses from the vicinity of the axis of the reaction pipe 11 toward the inner wall surface of the reaction pipe 11. That is, the density of titanium tetrachloride on the side of the inner wall surface of the reaction pipe 11 gradually increase in a direction toward the downstream side, and the possibility of generating the film-shaped product on the inner wall surface of the reaction pipe 11 increases.

For this reason, in the upstream part of the main heating region A where titanium tetrachloride exist in the vicinity of the axis of the reaction pipe 11, it is necessary to efficiently cause the oxidization reaction between oxygen and vapor of titanium tetrachloride, and to consume the vapor of titanium tetrachloride.

In addition, in order to efficiently cause the oxidization reaction between vapor of titanium tetrachloride and oxygen, it is necessary to optimally set the sectional area of each of the internal cylinder opening, the annular opening, and the external cylinder opening, and the linear velocity of each of the reaction gas, the barrier gas, and the merged gas.

<Sectional Area of Internal Cylinder Opening, Annular Opening, and External Cylinder Opening>

In a sectional view of the double-pipe structure portion 52 of the reaction pipe 11, the hollow external cylinder 1 having the circular external cylinder opening 28 is disposed so as to surround the hollow internal cylinder 5 having the circular internal cylinder opening 26. Accordingly, the annular opening 27 is disposed between the hollow external cylinder 1 and the hollow internal cylinder 5. That is, the double-pipe structure portion 52 is provided with two openings, that is, the internal cylinder opening 26 set to have the inner diameter of the hollow internal cylinder 5 and the annular opening 27 formed between the hollow external cylinder 1 and the hollow internal cylinder 5. In addition, the single-pipe structure portion 51 is provided with the external cylinder opening 28 set to have the inner diameter of the hollow external cylinder 1.

The reaction gas passes through the internal cylinder opening 26, and the barrier gas passes through the annular opening 27 formed between the hollow external cylinder 1 and the hollow internal cylinder 5. Then, the merged gas having the reaction gas and the barrier gas passes through the external cylinder opening 28.

It is desirable that the passageway sectional area of the barrier gas between the hollow external cylinder 1 and the hollow internal cylinder 5, that is, the sectional area of the annular opening 27 between the hollow external cylinder 1 and the hollow internal cylinder 5 is equal to or more than two times the passageway sectional area of the reaction gas of the hollow internal cylinder 5, that is, the sectional area of the internal, cylinder opening 26.

Since the passageway sectional area of the barrier gas is equal to or more than two times that of the reaction gas, at the time when the reaction gas and the barrier gas are discharged to the single-pipe structure portion 51, it is possible to prevent the reaction gas from moving closer to the inner wall surface of the reaction pipe 11. Accordingly, it is possible to further suppress the generation of the film-shaped product generated on the inner wall surface of the reaction pipe 11.

In addition, since the passageway sectional area of the barrier gas is equal to or more than two times that of the reaction gas, it is possible to suppress vapor of titanium tetrachloride from diffusing from the vicinity of the axis of the reaction pipe 11 toward the inner wall surface of the reaction pipe 11, and to suppress the generation of the film-shaped product generated on the inner wall surface of the reaction pipe 11.

Further, since there is a tendency that the generation amount of the film-shaped product decreases as the sectional area ratio becomes larger, it is more desirable that the sectional area of the annular opening 27 between the hollow external cylinder 1 and the hollow internal cylinder 5 is equal to or more than four times that of the internal cylinder opening 26, and it is much more desirable that the sectional area of the annular opening 27 is equal to or more than eight times that of the internal cylinder opening 26.

As a method for increasing the ratio between the sectional area of the annular opening 27 and the sectional area of the internal cylinder opening 26 by using the hollow external cylinder 1 having a uniform inner diameter, there are a method for making the outer diameter of the hollow internal cylinder 5 uniform and thickening the thickness of the hollow internal cylinder 5 so as to decrease the inner diameter of the hollow internal cylinder 5, and a method for making the inner diameter of the hollow internal cylinder 5 uniform and thinning the thickness of the hollow internal cylinder 5 so as to decrease the outer diameter of the hollow internal cylinder 5.

It is desirable that the passageway sectional area of the reaction pipe 11 on the downstream side of the downstream end 5b of the hollow internal cylinder 5, that is, the sectional area of the external cylinder opening 28 is equal to or more than three times the passageway sectional area of the reaction gas of the hollow internal cylinder 5, that is, the sectional area of the internal cylinder opening 26.

Since the passageway sectional area of the reaction gas is equal to or more than three times that of the merged gas, at the time when the reaction gas and the barrier gas are discharged to the single-pipe structure portion 51, it is possible to prevent the reaction gas from moving closer to the inner wall surface of the reaction pipe 11. Accordingly, it is possible to further suppress the generation of the film-shaped product generated on the inner wall surface of the reaction pipe 11.

In addition, since the sectional area of the space where the merged gas flows is equal to or more than three times the passageway sectional area of the reaction gas, it is possible to suppress vapor of titanium tetrachloride from diffusing from the vicinity of the axis of the reaction pipe 11 toward the inner wall surface of the reaction pipe 11, and to suppress the generation of the film-shaped product generated on the inner wall surface of the reaction pipe 11.

Further, since there is a tendency that the generation amount of the film-shaped product decreases as the sectional area ratio becomes larger, it is more desirable that the sectional area of the external cylinder opening 28 is equal to or more than six times that of the internal cylinder opening 26, and it is much more desirable that the sectional area of the external cylinder opening 28 is equal to or more than ten times that of the internal cylinder opening 26.

As a method for increasing the ratio between the sectional area of the external cylinder opening 28 and the sectional area of the internal cylinder opening 26, for example, there are a method for making the inner diameter of the hollow external cylinder 1 uniform and decreasing the inner diameter of the hollow internal cylinder 5, and a method for making the inner diameter of the hollow internal cylinder 5 uniform and increasing the inner diameter of the hollow external cylinder 1.

<Linear Velocity>

In the double-pipe structure portion 52, it is desirable that the ratio between the linear velocity of the barrier gas and the linear velocity of the reaction gas is equal to or more than 0.1 and equal to or less than 10. It is more desirable that the ratio is equal to or more than 0.25 and equal to or less than 4, and it is much more desirable that the ratio is equal to or more than 0.5 and equal to or less than 2.

When the reaction gas and the barrier gas substantially flow at the same speed, it is possible to suppress vapor of titanium tetrachloride from diffusing from the vicinity of the axis of the reaction pipe 11 toward the inner wall surface of the reaction pipe 11, and to prevent the reaction gas from moving closer to the inner wall surface of the reaction pipe 11. Accordingly, it is possible to further suppress the generation of the film-shaped product generated on the inner wall surface of the reaction pipe 11.

In the double-pipe structure portion 52, when the ratio between the linear velocity of the barrier gas and the linear velocity of the reaction gas is set to be less than 0.1, it is not possible to suppress vapor of titanium tetrachloride from diffusing from the vicinity of the axis of the reaction pipe 11 toward the inner wall surface of the reaction pipe 11. Accordingly, the amount of the film-shaped product fixed to the inner wall surface of the reaction pipe 11 increases.

On the contrary, when the ratio between the linear velocity of the barrier gas and the linear velocity of the reaction gas exceeds 10, the amount of the film-shaped product fixed to the inner wall surface of the reaction pipe 11 further increases.

<Elapsed Time>

It is desirable that the time (hereinafter, elapsed time) until the reaction gas discharged from the downstream end Sb of the hollow internal, cylinder 5 arrives at the most upstream end of the main heating region A heated to be equal to or more than 800° C. is equal to or less than 250 milliseconds, and it is more desirable that the elapsed time is equal to or less than 70 milliseconds.

In addition, since the reaction gas and the barrier gas are merged in the middle area Z so as to form the merged gas, the elapsed time may be set to a time until the merged gas arrives at the most upstream end of the main heating region A heated to be equal to or more than 800° C. from the discharged part of the downstream end 5b of the hollow internal cylinder 5.

In the case where the elapsed time is equal to or less than 250 milliseconds, the merged gas including the reaction gas and the barrier gas formed in the middle region Z so as to have the reaction gas and the barrier gas is immediately transferred to the main heating region A, and titanium tetrachloride contained in the reaction gas are immediately consumed by means of the oxidization reaction. That is, before the concentration of titanium tetrachloride in the vicinity of the inner wall surface of the reaction pipe 11 increases due to the diffusion of the vapor of titanium tetrachloride from the vicinity of the axis of the reaction pipe 11 toward the inner wall surface of the reaction pipe 11, the vapor of titanium tetrachloride is consumed. Accordingly, it is possible to decrease the amount of the film-shaped product generated on the inner wall surface of the reaction pipe 11.

In the case where the elapsed time is longer than 250 milliseconds and the merged gas is not immediately transferred to the main heating region A, the concentration distribution of the vapor of titanium tetrachloride in the vicinity of the inner wall surface of the reaction pipe 11 in the middle region Z increases, and hence the amount of the film-shaped product fixed to the inner wall surface of the reaction pipe 11 increases.

<Staying Time>

It is desirable that the time (hereinafter, staying time) during when the reaction gas, that is, the merged gas stays at the main heating region A is equal to or more than 2 and equal to or less than 500 milliseconds. It is more desirable that the staying time is equal to or more than 2 and equal to or less than 300 milliseconds, and it is much more desirable that the staying time is equal to or more than 50 and equal to or less than 250 milliseconds.

In the case where the staying time exceeds 500 milliseconds, titanium oxide particles easily adhere to each other, and the ratio of decahedral titanium oxide particles contained in the powder product decreases.

On the contrary, in the case where the staying time is less than 2 milliseconds, the oxidization reaction of titanium tetrachloride does not completely occur when titanium tetrachloride pass through the main heating region A, and unreacted titanium tetrachloride remain. Accordingly, the productivity of titanium oxide particles deteriorates, and the ratio of decahedral titanium oxide particles contained in the powder product decreases.

<Reynolds Number>

It is desirable that the Reynolds number of the reaction gas, that is, the Reynolds number of the merged gas, is equal to or more than 10 and equal to or less than 10,000. It is more desirable that the Reynolds number is equal to or more than 20 and equal to or less than 2,000, and it is much more desirable that the Reynolds number is equal to or more than 50 and equal to or less than 500.

When the Reynolds number is set to the above-described range, it is possible to improve the advantage of the barrier gas for suppressing vapor of titanium tetrachloride from diffusing toward the outside of the reaction pipe 11. Accordingly, it is possible to decrease the amount of the film-shaped product generated on the inner wall surface of the reaction pipe 11. In addition, the advantage is the most apparent in the case of a laminar flow having a Reynolds number equal to or more than 50 and equal to or less than 500.

In the case where the Reynolds number exceeds 10,000, the turbulent flow of the merged gas becomes apparent, and the advantage of the barrier gas for suppressing vapor of titanium tetrachloride from diffusing from the vicinity of the axis of the reaction pipe 11 toward the inner surface of the reaction pipe 11 is not exhibited. Accordingly, the amount of the film-shaped product fixed to the inner wall surface of the reaction pipe 11 increases.

On the contrary, in the case where the Reynolds number is less than 10, the linear velocity of each of the reaction gas and the barrier gas decreases, and the advantage of the barrier gas for suppressing vapor of titanium tetrachloride from diffusing from the vicinity of the axis of the reaction pipe 11 toward the inner surface of the reaction pipe 11 is not exhibited. Accordingly, the amount of the film-shaped product fixed to the inner wall surface of the reaction pipe 11 increases.

The Reynolds number Re is calculated by the equation of $Re=D \times u \times \rho/\mu$. Here, D denotes the inner diameter (m) of the hollow external cylinder 1, u denotes the linear velocity (m/s), $\rho$ denotes the density ($kg/m^3$), and $\mu$ denotes the viscosity [$kg/(m \times s)$].

<Inner Diameter D of Hollow External Cylinder>

In the embodiment, the value of the inner diameter D of the hollow external cylinder 1 is set to 21 (mm). In addition, the value of u is set to the linear velocity (conversion value at 1,200° C.) of the reacted merged gas ($Cl_2+O_2$).

The value of $\rho$ is set to the density (conversion value at 1,200° C.) of the reacted merged gas ($Cl_2+O_2$). Then, the value of $\mu$ is set to the viscosity (conversion value at 1,200° C.) of the reacted merged gas.

<Linear Velocity u of Merged Gas>

The value of the linear velocity u of the reacted merged gas ($Cl_2+O_2$) is set to the linear velocity u (conversion value at 1,200° C.) of the reaction gas ($TiCl_4+O_2$).

According to chemical formula (1), in the case where $TiCl_4$ contained in the reaction gas is completely consumed, $Cl_2$ two times larger in amount (flow rate) than $TiCl_4$ is generated, $O_2$ is consumed as much as the amount of $TiCl_4$, and the flow rate of $O_2$ decreases. Since the generated $TiO_2$ is not a gas, but particles, the flow rate of the entire flowing gas before and after the reaction is not changed.

<Density $\rho$ of Merged Gas>

In order to calculate the value of density $\rho$ of the reacted merged gas ($Cl_2+O_2$), the flow rate (that is, the flow rate of the reaction gas) of the reacted merged gas flowing per period is used.

First, the flow rate of the reacted merged gas is converted to $X_{1,200° C.}$ ($m^3$) which is the corresponding flow rate at 1200° C. The flow rate in the standard state (0° C. and 1 atm) of the flow rate $X_{1,200° C.}$ ($m^3$) of the reacted merged gas is used, and the mass $Y_{0° C., 1 atm}$ (kg) of the merged gas is obtained. At this time, the density $\rho=Y_{0° C., 1 atm}$ (kg)/$X_{1200° C.}$ ($m^3$) of the reacted merged gas is obtained.

<Viscosity $\mu$ of Merged Gas>

In the calculation of the viscosity $\mu$ of the reacted merged gas ($Cl_2+O_2$), the calculation equation of $\mu=\exp\{a+b \times \ln(t+273)\}$ is used. In the calculation equation, t denotes the temperature, and is 1200° C. herein. In addition, a and b are constants determined by the type of gas to be used. In the case of $Cl_2$, a=0.015 and b=0.864. In the case of $O_2$, a=1,289 and b=0.711, Further, the values of a and b are obtained from the simultaneous equation of a and b and the combination of t and $\mu$, which are already known.

<Viscosity $\mu$ of Merged Gas>

By means of the following equation, the viscosity $\mu$ of the reacted merged gas ($Cl_2+O_2$) is averaged, and the viscosity $\mu$ (at 1,200° C.) of the reacted merged gas is obtained.

The viscosity $\mu$ (at 1200° C.) of the reacted merged gas={(conversion value at 1,200° C. of the flow rate of $Cl_2$)×(viscosity of $Cl_2$ at 1,200° C.)+(conversion value at 1,200° C. of the flow rate of $O_2$)×(viscosity of $O_2$ at 1,200° C.)}/{flow rate of reacted merged gas ($Cl_2+O_2$)}

As described above, the titanium oxide particles axe exemplified as metal oxide particles, but the present invention is not limited thereto. For example, the metal oxide particles may be silicon oxide particles, tin oxide particles, or the like, in the cases of them, a reaction gas containing vapor of silicon tetrachloride or vapor of tin tetrachloride is used.

The method for producing the metal oxide particles (decahedral titanium oxide particles) according to the embodiment of the present invention is a method for producing metal oxide particles by allowing the reaction gas to flow into the reaction pipe 11 having a partial double-pipe structure (double-pipe structure portion 52) in which the hollow internal cylinder 5 is inserted into the upstream portion of the hollow external cylinder 1. The method includes the steps of: allowing the reaction gas containing metal chlorides to flow into the hollow internal cylinder 5 and a barrier gas not containing metal chlorides to flow between the hollow internal cylinder 5 and the hollow external cylinder 1; performing a preheating on the reaction gas and the barrier gas on the upstream side of the downstream end 5b of the hollow internal cylinder 5; and performing a main heating on the reaction gas in a downstream region distant from the downstream end 5b of the hollow internal cylinder 5 so as to thermally decompose the metal chlorides. Accordingly, it is possible to efficiently produce metal oxide particles such as decahedral titanium oxide particles suitable as a photocatalyst or other titanium oxide particles, in such a manner that a temperature suitable for the main heating is obtained in a short time, the oxidization reaction between the vapor of metal chlorides and oxygen is promptly performed, and the generation of the film-shaped product generated on the inner wall surface of the reaction pipe 11 is suppressed.

In the method for producing metal oxide particles according to the embodiment of the present invention, the generated metal oxide particles are the decahedral titanium oxide particles, wherein titanium tetrachloride is used as metal chloride, and it is possible to efficiently produce the titanium oxide particles by suppressing the generation of the film-shaped product generated on the inner wall surface of the reaction pipe 11.

In the method for producing metal oxide particles according to the embodiment of the present invention, since the preheating temperature is set to be equal to or more than 136° C. and equal to or less than 750° C., it is possible to efficiently produce the metal oxide particles by suppressing the generation of the film-shaped product generated on the inner wall surface of the reaction pipe 11.

In the method for producing metal oxide particles according to the embodiment of the present invention, since the main heating temperature is set to be equal to or more than 800° C. and equal to or less than 1,500° C., it is possible to efficiently produce the metal oxide particles by suppressing the generation of the film-shaped product generated on the inner wall surface of the reaction pipe 11.

In the method for producing metal oxide particles according to the embodiment of the present invention, since the reaction gas contains oxygen gas and/or nitrogen gas, it is possible to efficiently produce the metal oxide particles by suppressing the generation of the film-shaped product generated on the inner wall surface of the reaction pipe 11.

In the method for producing metal oxide particles according to the embodiment of the present invention, since the barrier gas contains oxygen gas, nitrogen gas, argon, vapor, or at least two kinds of gases among them, it is possible to efficiently produce the metal oxide particles by suppressing the generation of the film-shaped product generated on the inner wall surface of the reaction pipe 11.

In the method for producing metal oxide particles according to the embodiment of the present invention, since the passageway sectional area (sectional area of the annular opening 27) of the barrier gas between the hollow external cylinder 1 and the hollow internal cylinder 5 is equal to or more than two times the passageway sectional area (sectional area of the internal cylinder opening 26) of the reaction gas of the hollow internal cylinder 5, it is possible to efficiently produce the metal oxide particles by suppressing the generation of the film-shaped product generated on the inner wall surface of the reaction pipe 11.

In the method for producing metal oxide particles according to the embodiment of the present invention, since the passageway sectional area (sectional area of the external cylinder opening 28) of the reaction pipe 11 existing on the downstream side of the downstream end 5b of the hollow internal cylinder 5 is equal to or more than three times the passageway sectional area (sectional area of the internal cylinder opening 26) of the reaction gas of the hollow internal cylinder 5, it is possible to efficiently produce the metal oxide particles by suppressing the generation of the film-shaped product generated on the inner wall surface of the reaction pipe 11.

In the method for producing metal oxide particles according to the embodiment of the present invention, since the ratio between the linear velocity of the barrier gas and the linear velocity of the reaction gas is equal to or more than 0.1 and equal to or less than 10 in a region (double-pipe structure portion 52) existing on the upstream side of the downstream end 5b of the hollow internal cylinder 5, it is possible to efficiently produce the metal oxide particles by suppressing the generation of the film-shaped product generated on the inner wall surface of the reaction pipe 11.

In the method for producing metal oxide particles according to the embodiment of the present invention, since the density of metal chlorides contained in the reaction gas in a region (double-pipe structure portion 52) existing on the upstream side of the downstream end 5b of the hollow internal cylinder 5 is equal to or more than 0.5 and equal to or less than 50 vol %, it is possible to efficiently produce the metal oxide particles by suppressing the generation of the film-shaped product generated on the inner wall surface of the reaction pipe 11.

In the method for producing metal oxide particles according to the embodiment of the present invention, since the density of metal chlorides contained in the reaction gas in a region (single-pipe structure portion 51) on the downstream side of the downstream end 5b of the hollow internal cylinder 5 is equal to or more than 0.1 and equal to or less than 20 vol %, it is possible to efficiently produce the metal oxide particles by suppressing the generation of the film-shaped product generated on the inner wall surface of the reaction pipe 11.

In the method for producing metal oxide particles according to the embodiment of the present invention, since the time until the reaction gas discharged from the downstream end of the hollow internal cylinder arrives at the most upstream end of the main heating region A heated to be equal to or more than 800° C. is equal to or less than 250 milliseconds, it is possible to efficiently produce the metal oxide particles by suppressing the generation of the film-shaped product generated on the inner wall surface of the reaction pipe 11.

In the method for producing metal oxide particles according to the embodiment of the present invention, since the time during when the reaction gas stays at the main heating region is equal to or more than 2 and equal to or less than 500 milliseconds, it is possible to efficiently produce the metal oxide particles by suppressing the generation of the film-shaped product generated on the inner wall surface of the reaction pipe 11.

In the method for producing metal oxide particles according to the embodiment of the present invention, since the Reynolds number of the reaction gas is equal to or more than 10 and equal to or less than 10,000, it is possible to efficiently produce the metal oxide particles by suppressing the generation of the film-shaped product generated on the inner wall surface of the reaction pipe 11.

The apparatus 101 for producing metal oxide particles according to the embodiment of the present invention is an apparatus for producing metal oxide particles by allowing the reaction gas to flow into the reaction pipe 11 having a partial double-pipe structure (double-pipe structure portion 52) in which the hollow internal cylinder 5 is inserted into the upstream portion of the hollow external cylinder 1. The preheating regions X and Y are provided on the upstream side of the downstream end 5b of the hollow internal cylinder 5 so as to respectively perform a preheating on the reaction gas containing metal chlorides flowing into the hollow internal cylinder 5 and the barrier gas not containing metal chlorides flowing between the hollow internal cylinder 5 and the hollow external cylinder 1. The main heating region A is provided in a region on the downstream side of the downstream end 5b of the hollow internal cylinder 5 so as to perform a main heating on the reaction gas and to thermally decompose the metal chlorides. With the above-described configuration, it is possible to efficiently produce the metal oxide particles by suppressing the generation of the film-shaped product generated on the inner wall surface of the reaction pipe 11.

(Second Embodiment)

Figure 2:
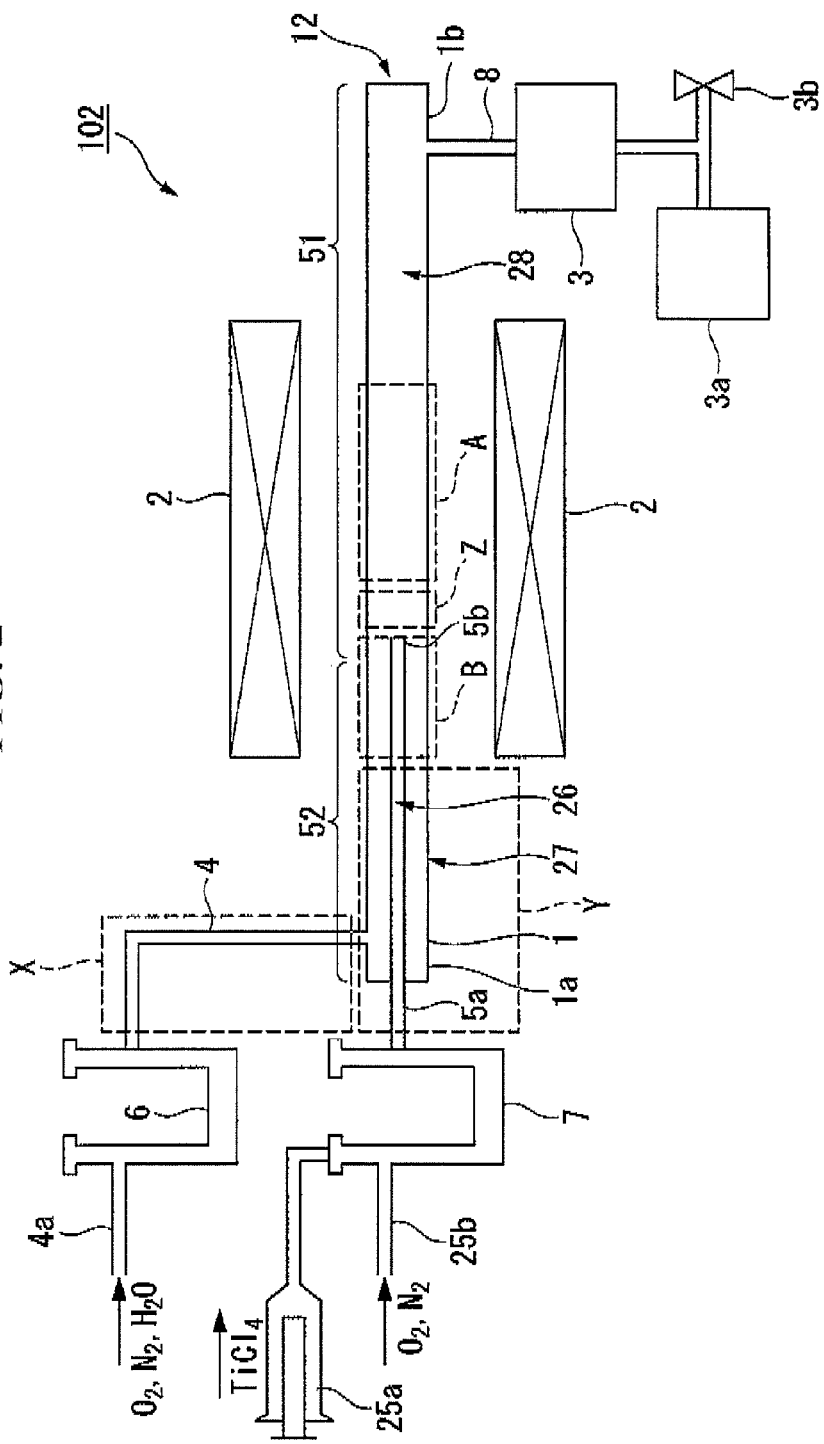
FIG. 2 is a schematic view showing another example of the apparatus for producing metal oxide particles (decahedral titanium oxide particles) according to the embodiment of the present invention.

FIG. 2 is a schematic view showing another example of the apparatus for producing metal oxide particles (decahedral titanium oxide particles) according to an embodiment of the present invention. The same reference numerals will be given to the same constituents as those of the first embodiment.

As shown in FIG. 2, in an apparatus 102 for producing metal oxide particles according to the embodiment of the present invention, the hollow internal cylinder 5 is disposed so that the downstream end 5b of the hollow internal cylinder 5 protrudes to a region interposed between two heating devices (infrared gold image furnaces) 2. Another preheating region B is formed from the downstream end of the preheating region Y to the downstream end 5b so that a platinum plate (not shown) is wound around the hollow external cylinder 1.

The other configurations are the same as those of the apparatus 101 for producing metal oxide particles according to the first embodiment.

The upstream portion and the downstream portion of each of the heating devices (infrared gold image furnaces) 2 are controlled by separate temperature controllers (not shown). Accordingly, the preheating region B and the main heating region A can be respectively controlled at arbitrarily set different temperatures.

When the reaction gas and the barrier gas pass through the preheating regions X, Y, and B, it is possible to more precisely control the temperatures thereof in a temperature range equal to or more than 136° C. and equal to or less than 750° C.

Next, another example of the method for producing metal oxide particles according to the embodiment of the present invention will be described with reference to the apparatus for producing metal oxide particle shown in FIG. 2.

As in the method for producing metal oxide particles according to the first embodiment, first, the barrier gas is introduced from the barrier gas introduction pipes 4 and 4a to the hollow external cylinder 1 of a reaction pipe 12, and the reaction gas is introduced from the reaction gas introduction pipes 25a and 25b to the hollow internal cylinder 5 of the reaction pipe 12. At this time, water is evaporated through the vaporizer 6, and titanium tetrachloride is changed into vapor of titanium tetrachloride through the vaporizer 7.

Next, the bather gas and the reaction gas are heated in the preheating regions X and Y, the barrier gas and the reaction gas are further heated in the preheating region B, and then the temperatures of the reaction gas and the barrier gas are precisely controlled to be a predetermined preheating temperature in a temperature range equal to or more than 136° C. and equal to or less than 750° C.

Next, the reaction gas and the barrier gas are merged in a middle region Z, and the merged gas is heated in a temperature range equal to or more than 800° C. and equal to or less than 1,500° C. at the main heating region A.

The merged gas passing through the main heating region A is immediately cooled, and titanium oxide particles are formed. The titanium oxide particles are collected to the product collecting portion 3.

In the method for producing metal oxide particles according to the embodiment of the present invention, in addition to the advantage according to the first embodiment, the barrier gas and the reaction gas are further heated in another preheating region B after the barrier gas and the reaction gas are preheated in the preheating regions X and Y, and the temperatures of the reaction gas and the barrier gas are precisely controlled so as to be a predetermined preheating temperature in the temperature range equal to or more than 136° C. and equal to or less than 750° C. Accordingly, it is possible to more efficiently produce the metal oxide particles by further suppressing the generation of the film-shaped product generated on the inner wall surface of the reaction pipe 12.

The apparatus 102 for producing metal oxide particles according to the embodiment of the present invention includes: the reaction pipe 12 which includes the double-pipe structure portion 52 having the hollow external cylinder 1 and the hollow internal cylinder 5 inserted from the upstream portion of the hollow external cylinder 1 to the middle portion thereof and the single-pipe structure portion 51 having only the hollow external cylinder 1; a heating device 2 which is disposed on the outside of the reaction pipe 12 so as to locally heat the single-pipe structure portion 51; the barrier gas introduction pipes 4 and 4a which are connected to the upstream portion of the hollow external cylinder 1; the reaction gas introduction pipes 25a and 25b which are connected to the upstream portion of the hollow internal cylinder 5; and the product collecting portion 3 which is connected to the downstream portion of the hollow external cylinder 1. With the above-described configuration, it is possible to efficiently produce the metal oxide particles such as decahedral titanium oxide particles by suppressing the generation of the film-shaped product generated on the inner wall surface of the reaction pipe 12.

EXAMPLES

Hereinafter, the present invention will be described in detail with reference to examples. However, the present invention is not limited to the examples, but may be appropriately modified into various forms in the scope without departing from the spirit of the present invention.

Example 1

As described below, titanium oxide particles were produced by using the apparatus 101 for producing metal oxide particles shown in FIG. 1.

First, a quartz pipe having an outer diameter of 25.0 mm, an inner diameter of 21.0 mm, and a thickness of 2.0 mm was used as the hollow external cylinder 1, a quartz pipe having an outer diameter of 12.7 mm, an inner diameter of 10.0 mm, and a thickness of 1.3 mm was used as the hollow internal cylinder 5, and then the hollow external cylinder 1 and the hollow internal cylinder 5 were coaxially disposed so as to make the reaction pipe 11 having a double-pipe structure. Accordingly, the sectional area of the annular opening was equal to 2.6 times the sectional area of the internal cylinder opening, and the sectional area of the external cylinder opening was equal to 4.09 times the sectional area of the internal cylinder opening.

Subsequently, the main heating region A was set in such a manner that a platinum plate of 16 cm was wound around a part of the reaction pipe 11, and the heating devices (infrared gold image furnaces) 2 were disposed so as to irradiate infrared rays to the portion.

In addition, the hollow internal cylinder 5 was disposed so that the downstream end 5b of the hollow internal cylinder 5 was disposed at a position 7 cm on the upstream side of the upstream end of the main heating region A. The preheating regions X and Y for preheating the reaction gas and the barrier gas were set by disposing the electric heaters so as to correspond to the arrangement.

The barrier gas consisting of oxygen ($O_2$) gas was introduced into the barrier gas introduction pipe 4a, and was introduced into the hollow external cylinder 1 through the inside of the vaporizer 6 heated to 165° C. In addition, the flow rate of the barrier gas was set to 2,316 NmL/min, A mixture gas of vapor of titanium tetrachloride ($TiCl_4$) and oxygen was used as the reaction gas. First, titanium tetrachloride introduced from the reaction gas introduction pipe 25a passed through the vaporizer 7 heated to 165° C. so as to be changed into vapor of titanium tetrachloride, oxygen was introduced from the reaction gas introduction pipe 25b, and then the reaction gas was introduced into the hollow internal cylinder 5 in the state where the vapor and the oxygen were mixed.

Subsequently, the reaction gas and the barrier gas were respectively heated to 150° C. in the preheating regions X and Y. In addition, the density of titanium tetrachloride contained in the reaction gas in the preheating regions X and Y was set to 2.7 vol %, and the flow rate of the reaction gas was set to 848 NmL/min. Further, the ratio between the linear velocity of the barrier gas and the linear velocity of the reaction gas in the preheating regions X and Y was set to 1.0.

Subsequently, the preheated reaction gas and barrier gas were merged in the middle region Z to thereby form a merged gas.

The concentration of titanium tetrachloride contained in the merged gas in the middle region Z was set to 0.72 vol %. In addition, the Reynolds number of the merged gas in the middle region Z was set to 72, the Reynolds number corresponding to a value on the assumption that the temperature of the merged gas in the portion on the downstream side of the downstream end 5b of the hollow internal cylinder 5 was 1,200° C. Further, the time (elapsed time) until the merged gas arrived at the most upstream end of the main heating region A after the merged gas was formed in the middle region Z was 88 milliseconds.

Subsequently, the merged gas was heated in the main heating region A while the heating device 2 was controlled by a temperature controller (not shown) so that the temperature of the surface of the platinum plate was 1,200° C.

At this time, the staying time of the merged gas in the main heating region A was set to 200 milliseconds, the staying time corresponding to a value on the assumption that the merged gas in a region on the downstream side of the downstream end Sb of the hollow internal cylinder 5 was 1,200° C. Finally, titanium oxide particles were collected at the product collecting portion 3.

The yield between the generated powder product and the raw material was 84%. In addition, it was found that the ratio of decahedral titanium oxide contained in the powder product was 70% by observing the titanium oxide particles using a scanning electron microscope.

Example 2

In the following conditions, titanium oxide particles were produced by using the apparatus 101 for producing metal oxide particles shown in FIG. 1. In addition, the other conditions except for the conditions described below were the same as those of Example 1.

First, a quartz pipe having an outer diameter of 12.0 mm, an inner diameter of 7.9 mm, and a thickness of 2.1 mm was used as the hollow internal cylinder 5 to thereby make the reaction pipe 11. Accordingly, the sectional area of the annular opening was equal to 4.8 times the sectional area of the internal cylinder opening, and the sectional area of the external cylinder opening was equal to 7.07 times the sectional area of the internal cylinder opening.

Subsequently, the barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,546 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 4.2 vol %, and the flow rate of the reaction gas was set to 534 NmL/min.

Subsequently, the preheated reaction gas and barrier gas were merged in the middle region Z to thereby form a merged gas.

The concentration of titanium tetrachloride contained in the merged gas in the middle region Z was set to 0.73 vol %. In addition, the Reynolds number of the merged gas in the middle region Z was set to 70.

Subsequently, the merged gas was heated in the main heating region A while the heating device 2 was controlled by a temperature controller (not shown) so that the temperature of the surface of the platinum plate was 1,200° C. At this time, the staying time of the merged gas in the main heating region A was set to 200 milliseconds. Finally, titanium oxide particles were collected to the product collecting portion 3.

The yield between the generated powder product and the raw material was 84%. The ratio of decahedral titanium oxide contained in the powder product was 70%.

Example 3

In the following conditions, titanium oxide particles were produced by using the apparatus 101 for producing metal oxide particles shown in FIG. 1. In addition, the other conditions except for the conditions described below were the same as those of Example 1.

First, a quartz pipe having an outer diameter of 12.4 mm, an inner diameter of 6.0 mm, and a thickness of 3.2 mm was used as the hollow internal cylinder 5 to thereby make the reaction pipe 11. Accordingly, the sectional area of the annular opening was equal to 8.1 times the sectional area of the internal cylinder opening, and the sectional area of the external cylinder opening was equal to 12.4 times the sectional area of the internal cylinder opening. In addition, the main heating region A and the preheating regions X and Y were set.

Subsequently, the barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,742 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 6.6 vol %, and the flow rate of the reaction gas was set to 338 NmL/min.

Subsequently, the preheated reaction gas and barrier gas were merged in the middle region Z to thereby form a merged gas.

The concentration of titanium tetrachloride contained in the merged gas in the middle region Z was set to 0.73 vol %. In addition, the Reynolds number of the merged gas in the middle region Z was set to 70.

Subsequently, the merged gas was heated in the main heating region A while the heating device 2 was controlled by a temperature controller (not shown) so that the temperature of the surface of the platinum plate was 1,200° C. At this time, the staying time of the merged gas in the main heating region A was set to 200 milliseconds.

Figure 5:
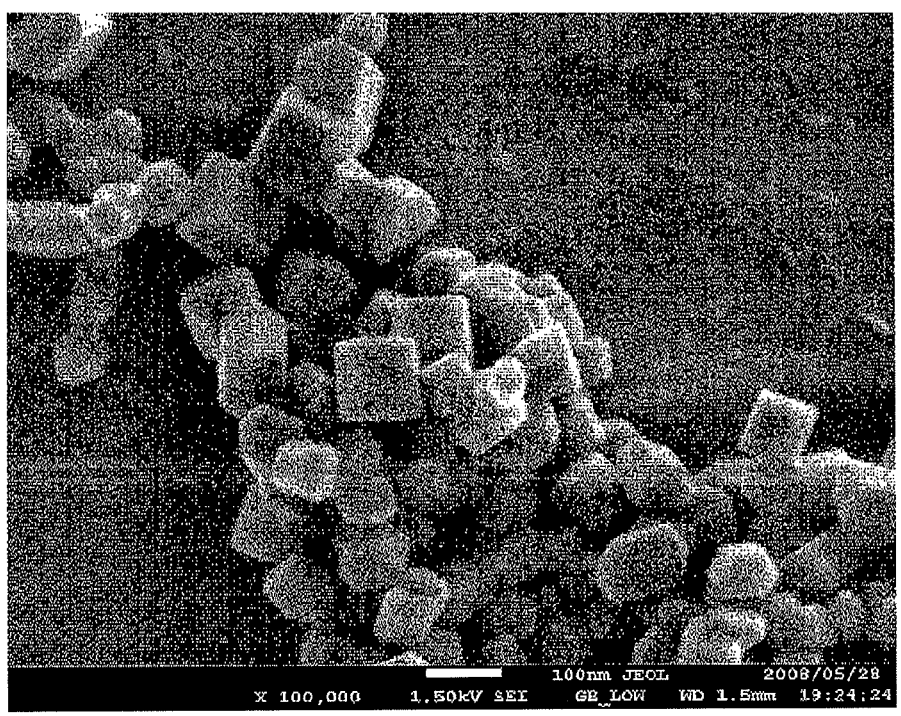
FIG. 5 is a scanning electron micrograph of the metal oxide particles (titanium oxide particles) of Example 3.

The yield between the generated powder product and the raw material was 90%. The ratio of decahedral titanium oxide contained in the powder product was 80%. In addition, FIG. 5 is a scanning electron micrograph of the titanium oxide particles obtained in this example.

Example 4

The conditions of this example were the same as those of Example 3 except that the downstream end 5b of the hollow internal cylinder 5 is located at a position 2 cm on the upstream side of the upstream end of the main heating region A, and in this condition, titanium oxide particles were produced. In addition, the time (elapsed time) until the merged gas arrived at the most upstream end of the main heating region A after the merged gas was formed in the middle region Z was 25 milliseconds.

The yield between the powder product and the raw material was 94%. The ratio of decahedral titanium oxide contained in the powder product was 70%.

Example 5

In the following conditions, titanium oxide particles were produced by using the apparatus 101 for producing metal oxide particles shown in FIG. 1. In addition, the other conditions except for the conditions described below were the same as those of Example 3.

First, a coaxial-parallel-flow quartz pipe having an outer diameter of 12.6 mm, an inner diameter of 4.1 mm, and a thickness of 4.2 mm was used as the hollow internal cylinder 5 to thereby make the reaction pipe 11. Accordingly, the sectional area of the annular opening was equal to 16.9 times the sectional area of the internal cylinder opening, and the sectional area of the external cylinder opening was equal to 26.3 times the sectional area of the internal cylinder opening.

The downstream end 5b of the hollow internal cylinder 5 was disposed at a position 2 cm on the upstream side of the upstream end of the main heating region A. Further, the time (elapsed time) until the merged gas arrived at the most upstream end of the main heating region A after the merged gas was formed in the middle region Z was 25 milliseconds.

Subsequently, the barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,908 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 13.0 vol %, and the flow rate of the reaction gas was set to 172 NmL/min.

The yield between the generated powder product and the raw material was 96%. The ratio of decahedral titanium oxide contained in the powder product was 80%.

Example 6

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,327 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 1.0 vol %, and the flow rate of the reaction gas was set to 831. NmL/min.

Subsequently, the preheated reaction gas and barrier gas were merged in the middle region Z to thereby form a merged gas.

The concentration of titanium tetrachloride contained in the merged gas in the middle region Z was set to 0.26 vol %. In addition, the Reynolds number of the merged gas in the middle region Z was set to 71.

The yield between the generated powder product and the raw material was 80%. The ratio of decahedral titanium oxide contained in the powder product was 70%.

Example 7

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,327 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 5.7 vol %, and the flow rate of the reaction gas was set to 831 NmL/min.

Subsequently, the preheated reaction gas and barrier gas were merged in the middle region Z to thereby form a merged gas.

The concentration of titanium tetrachloride contained in the merged gas in the middle region Z was set to 1.5 vol %. In addition, the Reynolds number of the merged gas in the middle region Z was set to 73.

The yield between the generated powder product and the raw material was 72%. The ratio of decahedral titanium oxide contained in the powder product was 80%.

Example 8

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,552 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 3.7 vol %, and the flow rate of the reaction gas was set to 606 NmL/min.

Further, the ratio between the linear velocity of the barrier gas and the linear velocity of the reaction gas in the preheating regions X and Y was set to 1.5.

Subsequently, the preheated reaction gas and barrier gas were merged in the middle region Z to thereby form a merged gas.

The concentration of titanium tetrachloride contained in the merged gas in the middle region Z was set to 0.72 vol %.

The yield between the powder product and the raw material was 72%. The ratio of decahedral titanium oxide contained in the powder product was 50%.

Example 9

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,458 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 3.2 vol %, and the flow rate of the reaction gas was set to 700 NmL/min.

Further, the ratio between the linear velocity of the barrier gas and the linear velocity of the reaction gas in the preheating regions X and Y was set to 1.25.

Subsequently, the preheated reaction gas and barrier gas were merged in the middle region Z to thereby form a merged gas.

The concentration of titanium tetrachloride contained in the merged gas in the middle region Z was set to 0.72 vol %.

The yield between the produced powder product and the raw material was 82%. The ratio of decahedral titanium oxide contained in the powder product was 60%.

Example 10

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,185 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 2.3 vol %, and the flow rate of the reaction gas was set to 973 NmL/min.

Further, the ratio between the linear velocity of the barrier gas and the linear velocity of the reaction gas in the preheating regions X and Y was set to 1/1.25.

Subsequently, the preheated reaction gas and barrier gas were merged in the middle region Z to thereby form a merged gas.

The concentration of titanium tetrachloride contained in the merged gas in the middle region Z was set to 0.72 vol %.

The yield between the generated powder product and the raw material was 81%. The ratio of decahedral titanium oxide contained in the powder product was 60%.

Example 11

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas was introduced into the hollow external cylinder 1, and the reaction gas consisting of vapor of titanium tetrachloride ($TiCl_4$) and oxygen was introduced into the hollow internal cylinder 5. In addition, the flow rate of the barrier gas was set to 2,058 NmL/min.

Subsequently, the reaction gas and the barrier gas were respectively heated to 150° C. in the preheating regions X and Y. In addition, the density of titanium tetrachloride contained in the reaction gas in the preheating regions X and Y was set to 2.1 vol %, and the flow rate of the reaction gas was set to 110 NmL/min.

Further, the ratio between the linear velocity of the barrier gas and the linear velocity of the reaction gas in the preheating regions X and Y was set to 1/1.5.

Subsequently, the preheated reaction gas and bather gas were merged in the middle region Z to thereby form a merged gas.

The concentration of titanium tetrachloride contained in the merged gas in the middle region Z was set to 0.72 vol %.

The yield between the generated powder product and the raw material was 80%.

The ratio of decahedral titanium oxide contained in the powder product was 60%.

Example 12

The conditions of this example were the same as those of Example 3 except that the downstream end 5b of the hollow internal cylinder 5 is located at a position 5 cm on the upstream side of the upstream end of the main heating region A, and in this condition, titanium oxide particles were produced. In addition, the time (elapsed time) until the merged gas arrived at the most upstream end of the main heating region A after the merged gas was formed in the middle region Z was 63 milliseconds.

The yield between the generated powder product and the raw material was 91%. The ratio of decahedral titanium oxide contained in the powder product was 50%.

Example 13

The conditions of this example were the same as those of Example 3 except that the downstream end 5b of the hollow internal cylinder 5 is located at a position 4 cm on the upstream side of the upstream end of the main heating region A, and in this condition, titanium oxide particles were produced. In addition, the time (elapsed time) until the merged gas arrived at the most upstream end of the main heating region A after the merged gas was formed in the middle region Z was 50 milliseconds.

The yield between the generated powder product and the raw material was 95%. The ratio of decahedral titanium oxide contained in the powder product was 50%.

Example 14

As described below, titanium oxide particles were produced by using the apparatus 102 for producing metal oxide particles shown in FIG. 2. In addition, the other conditions except for the conditions described below were the same as those of Example 13.

Another preheating region B wound by a platinum plate having a length of 8 cm was set on the upstream side of the downstream end 5b of the hollow internal cylinder 5.

In addition, the main heating region A wound by a platinum plate having a length of 16 cm was set on the downstream side of the downstream end 5b of the hollow internal cylinder 5 with the middle region having a width of 7 cm interposed therebetween.

Further, the heating devices (infrared gold image furnaces) 2 were provided so as to irradiate infrared rays to the two regions.

The heating devices (infrared gold image furnaces) 2 were controlled so that the temperature of the surface of the platinum plate of the preheating region B was equal to 500° C. and the temperature of the surface of the platinum plate of the main heating region A was equal to 1,200° C.

Finally, titanium oxide particles were collected to the product collecting portion 3.

The yield between the powder product and the raw material was 95%. The ratio of decahedral titanium oxide contained in the powder product was 50%.

Example 15

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas was introduced into the hollow external cylinder 1, and the reaction gas consisting of vapor of titanium tetrachloride ($TiCl_4$) and nitrogen ($N_2$) was introduced into the hollow internal cylinder 5. The Reynolds number of the merged gas in the middle region Z was set to 69.

The yield between the generated powder product and the raw material was 77%. The ratio of decahedral titanium oxide contained in the powder product was 80%.

Example 16

In the following conditions, titanium oxide particles were produced by using the apparatus 101 for producing metal oxide particles shown in FIG. 1. In addition, the other conditions except for the conditions described below were the same as those of Example 1.

The barrier gas consisting of nitrogen ($N_2$) gas was introduced into the hollow external cylinder 1, and the reaction gas consisting of vapor of titanium tetrachloride ($TiCl_4$) and oxygen ($O_2$) was introduced into the hollow internal cylinder 5.

The yield between the generated powder product and the raw material was 71%. The ratio of decahedral titanium oxide contained in the powder product was 60%.

Example 17

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas and vapor was introduced into the hollow external cylinder 1, and the reaction gas consisting of vapor of titanium tetrachloride ($TiCl_4$) and oxygen ($O_2$) was introduced into the hollow internal cylinder 5. In addition, the volume ratio of vapor of titanium tetrachloride and oxygen was set to 1:0.5. The Reynolds number of the merged gas in the middle region Z was set to 69.

The yield between the generated powder product and the raw material was 89%. The ratio of decahedral titanium oxide contained in the powder product was 50%.

Example 18

In the following conditions, titanium oxide particles were produced by using the apparatus 101 for producing metal oxide particles shown in FIG. 1. In addition, the other conditions except for the conditions described below were the same as those of Example 1.

The barrier gas consisting of oxygen ($O_2$) gas and vapor was introduced into the hollow external cylinder 1, and the reaction gas consisting of vapor of titanium tetrachloride ($TiCl_4$) and oxygen ($O_2$) was introduced into the hollow internal cylinder 5. In addition, the volume ratio between vapor of titanium tetrachloride ($TiCl_4$) and oxygen was set to 1:1. The Reynolds number of the merged gas in the middle region Z was set to 69.

The yield between the generated powder product and the raw material was 95%. The ratio of decahedral titanium oxide contained in the powder product was 40%.

Comparative Example 1

In the following conditions, titanium oxide particles were produced by using an apparatus 201 for producing metal oxide particles shown in FIG. 3. Here, the same reference numerals were given to the same constituents as those of Example 1. In addition, the other conditions except for the conditions described below were the same as those of Example 1.

Figure 3:
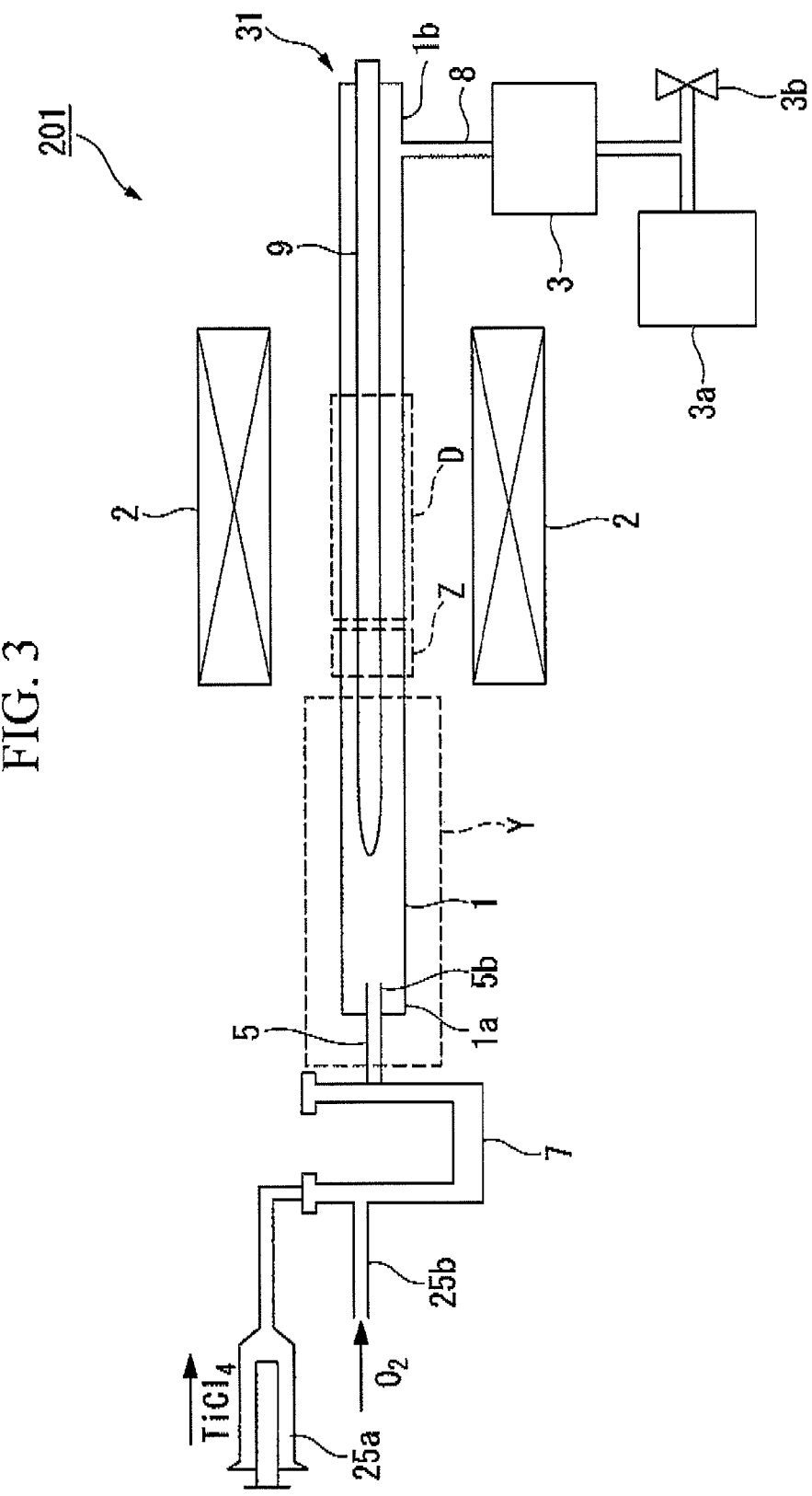
FIG. 3 is a schematic view showing a comparative example of the apparatus for producing metal oxide particle.

As shown in FIG. 3, the apparatus 201 for producing metal oxide particles was largely different from the apparatuses 101 and 102 for producing metal oxide particles according to the embodiment of the present invention in that the downstream end 5b of the hollow internal cylinder 5 was largely separated from the heating devices (infrared gold image furnaces) 2 to the upstream side, a double-pipe structure portion was not provided in a reaction pipe 31, and a baffle 9 was inserted into the reaction pipe 31. In addition, a quartz pipe having the same dimensions as that of Example 1 was used as the reaction pipe 31.

A mixture gas of vapor of titanium tetrachloride and oxygen ($O_2$) was used as the reaction gas. The reaction gas passed through the vaporizer 7 and was introduced from the downstream end 5b of the hollow internal cylinder 5 into the reaction pipe 31.

The baffle 9 was inserted from the downstream portion 1b of the reaction pipe 31. As shown in FIG. 3, for example, the baffle 9 was made in such a manner that a front end of a quartz pipe was closed to have a sharp shape, and was used to guide the reaction gas introduced from the hollow internal cylinder 5 into the reaction pipe 31 toward the inner wall surface of the reaction pipe 31 in a high temperature state. In addition, in this comparative example, the outer diameter of the baffle 9 was set to 12.7 mm.

The concentration of titanium tetrachloride contained in the mixture gas after passing through the vaporizer 7 was set to 0.72 vol %, and the total flow rate was set to 2,264 NmL/min.

A main heating region D was set in such a manner that a platinum plate having the same length as that of Example 1 was wound around the surface of the reaction pipe 31. The main heating region was formed so that the staying time of the reaction gas in the main heating region D and the temperature of the surface of the platinum plate were the same as those of Example 1. After main heating was conducted, titanium oxide particles were collected at the product collecting portion 3.

The yield between the generated powder product and the raw material was 31%. The ratio of decahedral titanium oxide contained in the powder product was 70%. In addition, the yield of the film-shaped product formed on the inner wall surface of the reaction pipe 31 was 63%.

Comparative Example 2

Metal oxide particles were produced such that the conditions of this comparative example were the same as that of Comparative Example 1 except that the flow rate of the reaction gas consisting of vapor of titanium tetrachloride and oxygen ($O_2$) after passing through the vaporizer 7 was set to 3,461 NmL/min, and the apparatus 201 for producing metal oxide particles which did not have the baffle 9 was use.

The yield between the generated powder product and the raw material was 40%. The ratio of decahedral titanium oxide contained in the powder product was 40%. In addition, the yield of the film-shaped product formed on the inner wall surface of the reaction pipe 31 was 55%.

Comparative Example 3

In the following conditions, titanium oxide particles were produced by using an apparatus 202 for producing metal oxide particles shown in FIG. 4, Here, the same reference numerals are given to the same constituents as those of Example 1. In addition, the other conditions except for the conditions described below were the same as those of Example 1.

Figure 4:
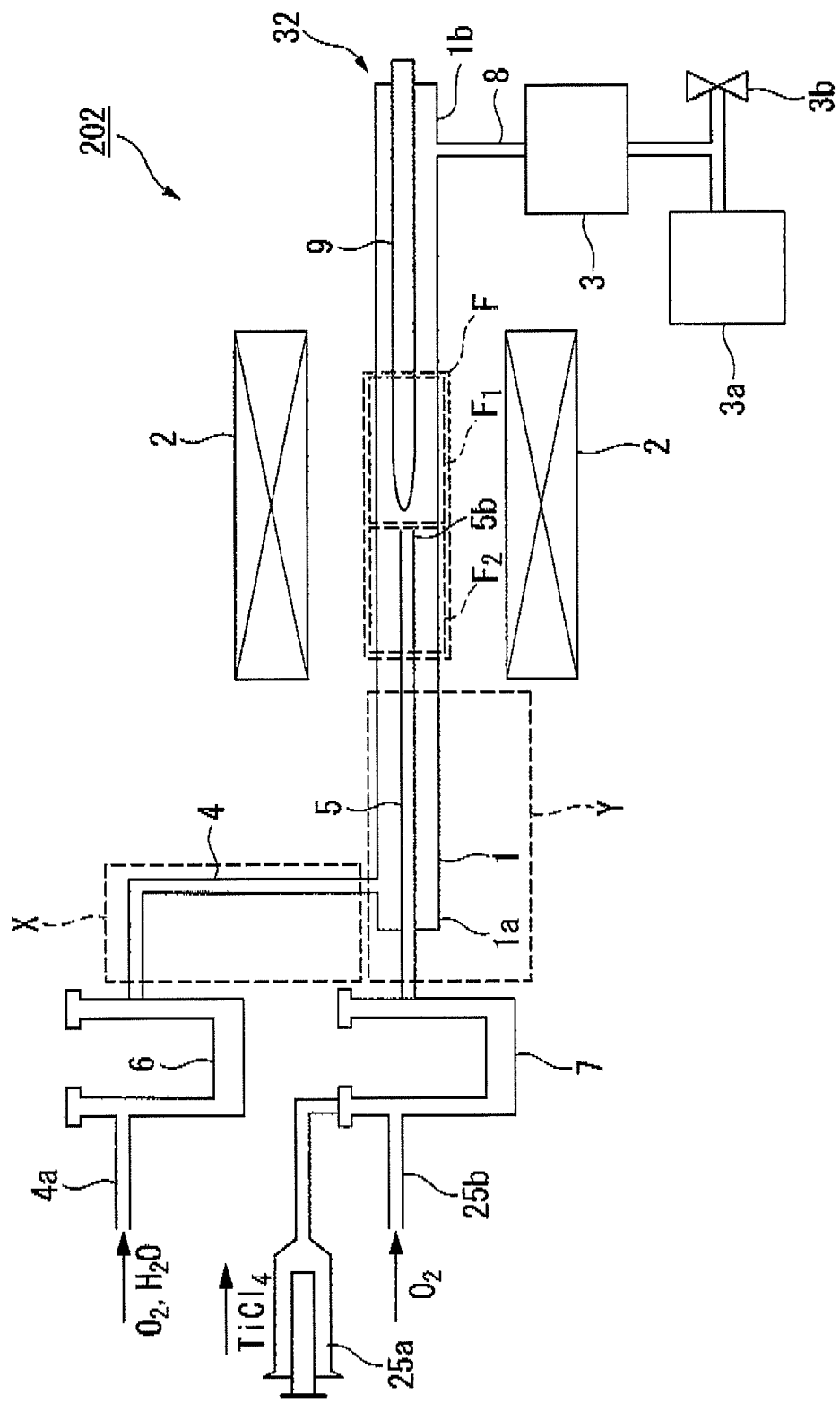
FIG. 4 is a schematic view showing another comparative example of the apparatus for producing metal oxide particle.

As shown in FIG. 4, the apparatus 202 for producing metal oxide particles was largely different from the apparatus 102 for producing metal oxide particles according to the embodiment of the present invention in that a heating region F was formed in such a manner that a platinum plate was wound around the surface of the hollow external cylinder 1 such that a part of the double-pipe structure portion 52 and a part of the single-pipe structure portion 51 were wound by the platinum plate, and the baffle 9 was inserted into a reaction pipe 32. In addition, quartz pipes each having the same dimensions as that of Example 1 were used as the reaction pipe 32 and the hollow internal cylinder 5.

The baffle 9 was inserted from the downstream portion 1b of the reaction pipe 32 so that its front end faced the downstream end 5b of the hollow internal cylinder 5. Accordingly, the baffle 9 was used to guide the reaction gas introduced from the hollow internal cylinder 5 into the reaction pipe 32 toward the inner wall surface of the reaction pipe 32 in a high temperature state. In addition, in this comparative example, the outer diameter of the baffle 9 was set to 12.7 mm.

A mixture gas consisting of oxygen and vapor was used as the barrier gas, and the barrier gas was allowed to flow at the flow rate of 2,530 NmL/min.

A mixture gas consisting of vapor of titanium tetrachloride and oxygen was used as the reaction gas. The concentration of titanium tetrachloride contained in the mixture gas after passing through the vaporizer 7 was set to 2.7 vol %, and the total flow rate was set to 928 NmL/min. In addition, the volume ratio between vapor of titanium tetrachloride and vapor was set to 1:3.

In addition, the ratio between the linear velocity of the barrier gas and the linear velocity of the reaction gas, the concentration of titanium tetrachloride contained in the merged gas, and the Reynolds number of the merged gas were set to the same values as those of Example 1.

A main heating region F was set in such a manner that a platinum plate having a length of 24 cm was wound around the surface of the reaction pipe 32. In addition, the hollow internal cylinder 5 was disposed so that the downstream end 5b of the hollow internal cylinder 5 was located at a position 8 cm on the downstream side of the upstream end of the main heating region F. For this reason, the main heating region F includes a double-pipe structure portion $F_2$ having the hollow internal cylinder 5 and the hollow internal cylinder 1 and a single-pipe structure portion $F_1$ having only the hollow external cylinder 1. Since the temperature of the main heating region F was set to 1,200° C., the temperatures of the double-pipe structure portion $F_2$ and the single-pipe structure portion $F_1$ were 1,200° C.

In the apparatus 202 for producing metal oxide particles shown in FIG. 4, since the middle region Z was not provided, the time (elapsed time) until the merged gas arrived at the most upstream end of the main heating region A was 0 millisecond.

The staying time of the reaction gas at the single-pipe structure portion $F_1$ of the main heating region F was set to 200 milliseconds, In addition, the main heating was performed in the state where the temperature of the surface of the platinum plate was set as in Example 1. Finally, titanium oxide particles were collected at the product collecting portion 3.

The yield between the generated powder product and the raw material was 40%. The ratio of decahedral titanium oxide contained in the powder product was 40%. In addition, the yield of the film-shaped product formed on the inner wall surface of the reaction pipe 31 was 58%.

The production conditions of Examples 1 to 18 and Comparative Examples 1 to 3 are shown in TABLE 1 (TABLES 1 (1) to (3)). In addition, the yield of the decahedral titanium oxide particles, the film-shaped product, and the titanium oxide particles obtained in Examples 1 to 18 and Comparative Examples 1 to 3 are shown in TABLE 2.

TABLE 1

| PRODUCTION APPARATUS | INTERNAL CYLINDER INNER DIAMETER (mm) | SECTIONAL AREA OF ANNULAR OPENING/ SECTIONAL AREA OF INTERNAL CYLINDER OPENING | SECTIONAL AREA OF EXTERNAL CYLINDER OPENING/ SECTIONAL AREA OF INTERNAL CYLINDER OPENING | CONCENTRATION (vol %) OF TITANIUM TETRACHLORIDE | | RATIO OF LINEAR VELOCITY (OUTSIDE) OF BARRIER GAS/ LINEAR VELOCITY (INSIDE) OF REACTION GAS |
|---|---|---|---|---|---|---|
| | | | | DOUBLE-PIPE STRUCTURE PORTION (ON UPSTREAM SIDE OF DOWNSTREAM END OF INTERNAL CYLINDER) | SINGLE-PIPE STRUCTURE PORTION (ON DOWNSTREAM SIDE OF DOWNSTREAM END OF INTERNAL CYLINDER) | |
| (1) | | | | | | |
| EXAMPLE 1 | FIG. 1 | 10 | 2.6 TIMES | 4.09 TIMES | 2.7% | 0.72% | OUTSIDE/INSIDE = 1/1 |
| EXAMPLE 2 | FIG. 1 | 7.9 | 4.8 TIMES | 7.07 TIMES | 4.2% | 0.73% | OUTSIDE/INSIDE = 1/1 |
| EXAMPLE 3 | FIG. 1 | 6 | 8.1 TIMES | 12.4 TIMES | 6.6% | 0.73% | OUTSIDE/INSIDE = 1/1 |
| EXAMPLE 4 | FIG. 1 | 6 | 8.1 TIMES | 12.4 TIMES | 6.6% | 0.73% | OUTSIDE/INSIDE = 1/1 |
| EXAMPLE 5 | FIG. 1 | 4.1 | 16.9 TIMES | 26.3 TIMES | 13.0% | 0.73% | OUTSIDE/INSIDE = 1/1 |
| EXAMPLE 6 | FIG. 1 | 10 | 2.6 TIMES | 4.09 TIMES | 1.0% | 0.26% | OUTSIDE/INSIDE = 1/1 |
| EXAMPLE 7 | FIG. 1 | 10 | 2.6 TIMES | 4.09 TIMES | 5.7% | 1.50% | OUTSIDE/INSIDE = 1/1 |
| (2) | | | | | | |
| EXAMPLE 8 | FIG. 1 | 10 | 2.6 TIMES | 4.09 TIMES | 3.7% | 0.72% | OUTSIDE/INSIDE = 1.5/1 |
| EXAMPLE 9 | FIG. 1 | 10 | 2.6 TIMES | 4.09 TIMES | 3.2% | 0.72% | OUTSIDE/INSIDE = 1.25/1 |
| EXAMPLE 10 | FIG. 1 | 10 | 2.6 TIMES | 4.09 TIMES | 2.3% | 0.72% | OUTSIDE/INSIDE = 1/1.25 |
| EXAMPLE 11 | FIG. 1 | 10 | 2.6 TIMES | 4.09 TIMES | 2.1% | 0.72% | OUTSIDE/INSIDE = 1/1.5 |
| EXAMPLE 12 | FIG. 1 | 6 | 8.1 TIMES | 12.4 TIMES | 6.6% | 0.73% | OUTSIDE/INSIDE = 1/1 |
| EXAMPLE 13 | FIG. 1 | 6 | 8.1 TIMES | 12.4 TIMES | 6.6% | 0.73% | OUTSIDE/INSIDE = 1/1 |
| EXAMPLE 14 | FIG. 2 | 6 | 8.1 TIMES | 12.4 TIMES | 6.6% | 0.73% | OUTSIDE/INSIDE = 1/1 |
| (3) | | | | | | |
| EXAMPLE 15 | FIG. 1 | 10 | 2.6 TIMES | 4.09 TIMES | 2.7% | 0.72% | OUTSIDE/INSIDE = 1/1 |
| EXAMPLE 16 | FIG. 1 | 10 | 2.6 TIMES | 4.09 TIMES | 2.7% | 0.72% | OUTSIDE/INSIDE = 1/1 |
| EXAMPLE 17 | FIG. 1 | 10 | 2.6 TIMES | 4.09 TIMES | 2.8% | 0.74% | OUTSIDE/INSIDE = 1/1 |
| EXAMPLE 18 | FIG. 1 | 10 | 2.6 TIMES | 4.09 TIMES | 2.60% | 0.72% | OUTSIDE/INSIDE = 1/1 |
| COMPARATIVE EXAMPLE 1 | FIG. 3 | — | — | — | — | 0.72% | — |
| COMPARATIVE EXAMPLE 2 | FIG. 3 (WITHOUT BAFFLE) | — | — | — | — | 0.72% | — |
| COMPARATIVE EXAMPLE 3 | FIG. 4 | 10 | 2.6 TIMES | 4.09 TIMES | 2.7% | 0.72% | OUTSIDE/INSIDE = 1/1 |

TABLE 1-continued

| | PREHEATING TEMPERATURE (° C.) | DISTANCE (cm) BETWEEN PLATINUM PLATE AND DOWNSTREAM END OF INTERNAL CYLINDER | ELAPSED TIME (millisecond) | MAIN HEATING TEMPERATURE (° C.) | TYPE OF REACTION GAS | TYPE OF BARRIER GAS |
|---|---|---|---|---|---|---|
| (1) | | | | | | |
| EXAMPLE 1 | 150 | 7 | 88 | 1,200 | TITANIUM TETRACHLORIDE, OXYGEN | OXYGEN |
| EXAMPLE 2 | 150 | 7 | 88 | 1,200 | TITANIUM TETRACHLORIDE, OXYGEN | OXYGEN |
| EXAMPLE 3 | 150 | 7 | 88 | 1,200 | TITANIUM TETRACHLORIDE, OXYGEN | OXYGEN |
| EXAMPLE 4 | 150 | 2 | 25 | 1,200 | TITANIUM TETRACHLORIDE, OXYGEN | OXYGEN |
| EXAMPLE 5 | 150 | 2 | 25 | 1,200 | TITANIUM TETRACHLORIDE, OXYGEN | OXYGEN |
| EXAMPLE 6 | 150 | 7 | 88 | 1,200 | TITANIUM TETRACHLORIDE, OXYGEN | OXYGEN |
| EXAMPLE 7 | 150 | 7 | 88 | 1,200 | TITANIUM TETRACHLORIDE, OXYGEN | OXYGEN |
| (2) | | | | | | |
| EXAMPLE 8 | 150 | 7 | 88 | 1,200 | TITANIUM TETRACHLORIDE, OXYGEN | OXYGEN |
| EXAMPLE 9 | 150 | 7 | 88 | 1,200 | TITANIUM TETRACHLORIDE, OXYGEN | OXYGEN |
| EXAMPLE 10 | 150 | 7 | 88 | 1,200 | TITANIUM TETRACHLORIDE, OXYGEN | OXYGEN |
| EXAMPLE 11 | 150 | 7 | 88 | 1,200 | TITANIUM TETRACHLORIDE, OXYGEN | OXYGEN |
| EXAMPLE 12 | 150 | 5 | 63 | 1,200 | TITANIUM TETRACHLORIDE, OXYGEN | OXYGEN |
| EXAMPLE 13 | 150 | 4 | 50 | 1,200 | TITANIUM TETRACHLORIDE, OXYGEN | OXYGEN |
| EXAMPLE 14 | 150/500 | 4 | 50 | 1,200 | TITANIUM TETRACHLORIDE, OXYGEN | OXYGEN |
| (3) | | | | | | |
| EXAMPLE 15 | 150 | 7 | 88 | 1,200 | TITANIUM TETRACHLORIDE, OXYGEN | OXYGEN |
| EXAMPLE 16 | 150 | 7 | 88 | 1,200 | TITANIUM TETRACHLORIDE, OXYGEN | NITROGEN |
| EXAMPLE 17 | 150 | 7 | 88 | 1,200 | TITANIUM TETRACHLORIDE, OXYGEN | OXYGEN, VAPOR |
| EXAMPLE 18 | 150 | 7 | 88 | 1,200 | TITANIUM TETRACHLORIDE, OXYGEN | OXYGEN, VAPOR |
| COMPARATIVE EXAMPLE 1 | 150 | — | — | 1,200 | TITANIUM TETRACHLORIDE, OXYGEN | — |
| COMPARATIVE EXAMPLE 2 | 150 | — | — | 1,200 | TITANIUM TETRACHLORIDE, OXYGEN | — |

TABLE 1-continued

| | | | | | | |
|---|---|---|---|---|---|---|
| COMPARATIVE EXAMPLE 3 | 150 | 4 | 0 | 1,200 | TITANIUM TETRACHLORIDE, OXYGEN | OXYGEN, VAPOR |

TABLE 2

| | YIELD (%) OF POWDER PRODUCT (TITANIUM OXIDE PARTICLES) | YIELD (%) OF FILM-SHAPED PRODUCT | TOTAL YIELD (%) OF POWDER PRODUCT AND FILM-SHAPED PRODUCT | RATIO (%) OF DECAHEDRAL TITANIUM OXIDE PARTICLES IN POWDER PRODUCT (TITANIUM OXIDE PARTICLES) |
|---|---|---|---|---|
| EXAMPLE 1 | 84 | — | — | 70 |
| EXAMPLE 2 | 88 | — | — | 70 |
| EXAMPLE 3 | 90 | — | — | 80 |
| EXAMPLE 4 | 94 | — | — | 70 |
| EXAMPLE 5 | 96 | — | — | 80 |
| EXAMPLE 6 | 80 | — | — | 70 |
| EXAMPLE 7 | 72 | — | — | 80 |
| EXAMPLE 8 | 72 | — | — | 50 |
| EXAMPLE 9 | 82 | — | — | 60 |
| EXAMPLE 10 | 81 | — | — | 60 |
| EXAMPLE 11 | 80 | — | — | 60 |
| EXAMPLE 12 | 91 | — | — | 50 |
| EXAMPLE 13 | 95 | — | — | 50 |
| EXAMPLE 14 | 95 | — | — | 50 |
| EXAMPLE 15 | 77 | — | — | 80 |
| EXAMPLE 16 | 71 | — | — | 60 |
| EXAMPLE 17 | 89 | — | — | 50 |
| EXAMPLE 18 | 95 | — | — | 40 |
| COMPARATIVE EXAMPLE 1 | 31 | 63 | 94 | 70 |
| COMPARATIVE EXAMPLE 2 | 40 | 55 | 95 | 40 |
| COMPARATIVE EXAMPLE 3 | 40 | 58 | 98 | 40 |

Here, the yield of titanium oxide particles is the ratio of the mass of the produced titanium oxide particles with respect to the mass of the used titanium tetrachloride. In addition, the yield of the film-shaped product is the ratio of the mass of the produced film-shaped product with respect to the mass of the used titanium tetrachloride. Further, the yield of decahedral titanium oxide particles is obtained by calculating the ratio of the decahedral titanium oxide particles with respect the produced titanium oxide particles as the result of observing the produced titanium oxide particles at five or more FOVs through a scanning electron microscope.

As shown in TABLE 1, in Comparative Examples 1 to 3, the yield of the powder product (titanium oxide particles) was low such that it was equal to or more than 30 and equal to or less than 40%, but the yield of the film-shaped product was about 60%, and the film-shaped product was fixed to the inner wall of the reaction pipe.

On the contrary, in Example 1 in which the reaction pipe has the double-pipe structure portion and does not have the baffle, the yield of the film shaped product was largely decreased, and the yield of the powder product was largely increased to be 84%.

In Examples 1 to 5, the ratio between the sectional area of the annular opening and the sectional area of the internal cylinder opening was set to be large by decreasing the inner diameter of the hollow internal cylinder in the state where the outer diameter of the hollow internal cylinder was set to be substantially uniform. At the same time, the ratio between the sectional area of the external cylinder opening and the sectional area of the internal cylinder opening was set to be large.

In accordance with increases of the ratio of the sectional areas of the annular opening and the ratio of the sectional areas of the external cylinder opening with respect to the internal cylinder opening, the yield of the powder product was increased.

In Examples 1, 6, and 7, the concentration (vol %) of titanium tetrachloride at the double-pipe structure portion and the single-pipe structure portion was changed and comparison thereof was performed. Even when the concentration of titanium tetrachloride was changed, the powder product was obtained at a high yield of 72% or more. In addition, the ratio between decahedral titanium oxide particles and the generated powder product was 70% or more.

In Examples 1 and 8 to 11, the ratio between the linear velocity of the barrier gas and the linear velocity of the reaction gas was changed and comparison thereof was performed. Even when the ratio of the linear velocity was changed, the powder product was obtained at a high yield of 72% or more. In addition, the ratio between decahedral titanium oxide particles and the powder product was 50% or more.

Particularly, when the ratio of the linear velocity was set to about 1:1, the yield of the powder product was the highest at 84%, and the ratio between decahedral titanium oxide particles and the generated powder product was 70%, and it was the highest ratio.

In Examples 3, 4, 12, and 13, the time (elapsed time) until the merged gas containing the reaction gas and the barrier gas arrived at the most upstream end of the main heating region was changed by changing the distance between the downstream end of the hollow internal cylinder and the platinum plate, and comparison thereof was performed. Here, the main heating region was a region wound by the platinum plate, and was set to the main heating temperature of 1,200° C.

When the time was set to be short such that the time was equal to or less than 50 milliseconds, the yield of the powder product was increased to be equal to or more than 94 and equal to or less than 96%.

Differently from. Example 13, in Example 14, another preheating region was provided. Even when the preheating temperature of this preheating region was increased to be 500° C., the powder product was obtained at a high yield of 95%, and the ratio between decahedral titanium oxide particles and the powder product was high and was 50%.

Differently from Example 1, in Example 15, the type of the reaction gas was changed. As shown in Example 15, even when the reaction gas was a mixture gas of vapor of titanium tetrachloride and nitrogen, the powder product was obtained at a high yield of 77%, and the ratio between decahedral titanium oxide particles and the powder product was high and was 80%.

Differently from Example 1, in Examples 16 to 18, the type of the barrier gas was changed.

As shown in Example 16, even when nitrogen was used as the barrier gas, the powder product was obtained at a high yield of 71%, and the ratio between decahedral titanium oxide particles and the powder product was increased to be 60%.

In addition, as shown in Examples 17 and 18, in the case where oxygen and vapor were used as the barrier gas, the yield of the powder product was increased in accordance with an increase in volume ratio of vapor with respect to vapor of titanium tetrachloride, but the ratio between decahedral titanium oxide particles and the powder product was decreased.

As described, according to the method and apparatus for producing metal oxide particles of the present invention, it is possible to efficiently produce decahedral titanium oxide particles by suppressing the generation of the film-shaped product generated on the inner wall portion of the reaction pipe.

Industrial Applicability

The present invention provides a method and apparatus for producing decahedral titanium oxide particles capable of efficiently and continuously producing the metal oxide particles by suppressing the generation of the film-shaped product fixed to the inner wall portion of the reaction pipe, and rapidly heating and cooling vapor of metal chlorides and oxygen.

Since the method and apparatus for producing decahedral titanium oxide particles is capable of efficiently producing the decahedral titanium oxide particles suitable for a photocatalyst by suppressing the generation of the film-shaped product fixed to the inner wall portion of the reaction pipe, the method and apparatus may be applied to the field of the photocatalyst industry and the like.

BRIEF DESCRIPTION OF THE REFERENCE SYMBOLS

1: hollow external cylinder
1a: upstream portion
1b: downstream portion
2: heating device (infrared gold image furnace)
3: product collecting portion
3a: discharge pump
3b: pressure control valve
4, 4a: barrier gas introduction pipe
5: hollow internal cylinder
5a: upstream portion
5b: downstream portion (downstream end)
6, 7: vaporizer
8: discharge pipe
9: baffle
11, 12: reaction pipe
25a, 25b: reaction gas introduction pipe
26: internal cylinder opening
27: annular opening
28: external cylinder opening
31, 32: reaction pipe
101, 102, 201, 202: apparatus for producing metal oxide particles
A: main heating region
B: preheating region
D: main heating region
F: main heating region
$F_1$: main heating region
$F_2$: main heating region
X: preheating region
Y: preheating region
Z: middle region

The invention claimed is:

1. A method for producing decahedral titanium oxide particles, wherein
the decahedral titanium oxide particles are produced by allowing a reaction gas containing titanium tetrachloride to flow into a reaction pipe having a partial double-pipe structure in which a hollow internal cylinder is inserted into an upstream portion of a hollow external cylinder,
the method comprising:
performing a preheating on the reaction gas containing titanium tetrachloride and a barrier gas not containing metal chlorides but including water vapor in a region of the reaction pipe, wherein the region exists on the upstream side of a downstream end of the hollow internal cylinder, while allowing the reaction gas to flow into the hollow internal cylinder and the barrier gas to flow between the hollow internal cylinder and the hollow external cylinder; and
performing a main heating on a mixed gas, which includes the reaction gas and the barrier gas, in a downstream region apart from the downstream end of the hollow internal cylinder to thermally decompose the titanium tetrachloride; wherein
a sectional area of a passageway for the barrier gas between the hollow external cylinder and the hollow internal cylinder is equal to or more than four times a sectional area of a passageway for the reaction gas of the hollow internal cylinder,
wherein
the time until the reaction gas discharged from the downstream end of the hollow internal cylinder arrives at the most upstream end of a main heating region heated to be equal to or more than 800° C. is equal to or less than 250 milliseconds, and
the time during which the reaction gas stays at the main heating region is equal to or more than 2 milliseconds and equal to or less than 300 milliseconds.

2. The method according to claim 1, wherein the preheating temperature is equal to or more than 136° C. and equal to or less than 750° C.

3. The method according to claim 1, wherein the main heating temperature is equal to or more than 800° C. and equal to or less than 1,500° C.

4. The method according to claim 1, wherein the reaction gas contains oxygen gas and/or nitrogen gas.

5. The method according to claim 1, wherein the barrier gas contains oxygen gas, nitrogen gas, argon, water vapor, or at least two kinds of gases among them.

6. The method according to claim 1, wherein a sectional area of a passageway of the reaction pipe on the downstream side of the downstream end of the hollow internal cylinder is equal to or more than seven times a sectional area of a passageway for the reaction gas of the hollow internal cylinder.

7. The method according to claim 1, wherein the ratio between a linear velocity of the barrier gas and a linear velocity of the reaction gas, wherein the velocities are measured on the upstream side of the downstream end of the hollow internal cylinder, is equal to or more than 0.5 and equal to or less than 2.

8. The method according to claim 1, wherein the concentration of the titanium tetrachloride contained in the reaction gas, which is located on the upstream side of the downstream end of the hollow internal cylinder, is equal to or more than 0.5 vol% and equal to or less than 50 vol%.

9. The method according to claim 1, wherein the concentration of the titanium tetrachloride contained in a merged gas having the reaction gas and the barrier gas, wherein the merged gas is located on a downstream region apart from the downstream end of the hollow internal cylinder, is equal to or more than 0.1 vol% and equal to or less than 20 vol%.

10. The method according to claim 1, wherein the sectional area of the passageway for the barrier gas between the hollow external cylinder and the hollow internal cylinder is equal to or more than 4.8 times the sectional area of the passageway for the reaction gas of the hollow internal cylinder.

11. The method according to claim 1, wherein the sectional area of the passageway for the barrier gas between the hollow external cylinder and the hollow internal cylinder is equal to or more than eight times the sectional area of the passageway for the reaction gas of the hollow internal cylinder.

12. The method according to claim 1, wherein the time until the reaction gas discharged from the downstream end of the hollow internal cylinder arrives at the most upstream end of a main heating region heated to be equal to or more than 800° C. is equal to or less than 70 milliseconds.

13. The method according to claim 1, wherein the barrier gas contains oxygen gas.

14. The method according to claim 1, wherein the preheating temperature is equal to or more than 136° C. and equal to or less than 750° C., and the main heating temperature is equal to or more than 800° C. and equal to or less than 1,500° C.

15. The method according to claim 1, wherein the preheating temperature is equal to or more than 150° C. and equal to or less than 500° C., and the main heating temperature is equal to or more than 800° C. and equal to or less than 1,500° C.

16. A method for producing decahedral titanium oxide particles, wherein the decahedral titanium oxide particles are produced by allowing a reaction gas containing titanium tetrachloride to flow into a reaction pipe having a partial double-pipe structure in which a hollow internal cylinder is inserted into an upstream portion of a hollow external cylinder, the method comprising:

performing a preheating on the reaction gas containing titanium tetrachloride and a barrier gas not containing metal chlorides in a region of the reaction pipe, wherein the region exists on the upstream side of a downstream end of the hollow internal cylinder, while allowing the reaction gas to flow into the hollow internal cylinder and the barrier gas to flow between the hollow internal cylinder and the hollow external cylinder; and performing a main heating on a mixed gas, which includes the reaction gas and the barrier gas, in a downstream region apart from the downstream end of the hollow internal cylinder to thermally decompose the titanium tetrachloride; wherein a sectional area of a passageway for the barrier gas between the hollow external cylinder and the hollow internal cylinder is equal to or more than four times a sectional area of a passageway for the reaction gas of the hollow internal cylinder, the time until the reaction gas discharged from the downstream end of the hollow internal cylinder arrives at the most upstream end of a main heating region heated to be equal to or more than 800° C. is equal to or less than 250 milliseconds, and the time during which the reaction gas stays at the main heating region is equal to or more than 2 milliseconds and equal to or less than 300 milliseconds, and the preheating temperature is equal to or more than 136° C. and equal to or less than 750° C., the main heating temperature is equal to or more than 800° C. and equal to or less than 1,500° C., and the main heating is not performed in a region of the reaction pipe where the double-pipe structure exists.

\* \* \* \* \*